(12) United States Patent
Yang et al.

(10) Patent No.: US 10,165,046 B2
(45) Date of Patent: *Dec. 25, 2018

(54) METHOD AND SYSTEM FOR TRANSMITTING DATA AMONG PEER STATIONS IN A DECENTRALIZED MANNER WITH HIGH CHANNEL EFFICIENCY

(71) Applicant: Futurewei Technologies, Inc., Plano, TX (US)

(72) Inventors: Yunsong Yang, San Diego, CA (US); Ping Fang, Shenzhen (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 43 days.

This patent is subject to a terminal disclaimer.

(21) Appl. No.: 15/092,471

(22) Filed: Apr. 6, 2016

(65) Prior Publication Data
US 2016/0345295 A1 Nov. 24, 2016

Related U.S. Application Data

(60) Provisional application No. 62/165,640, filed on May 22, 2015.

(51) Int. Cl.
*H04W 68/02* (2009.01)
*H04L 29/08* (2006.01)
(Continued)

(52) U.S. Cl.
CPC .......... *H04L 67/104* (2013.01); *H04W 8/005* (2013.01); *H04W 68/005* (2013.01);
(Continued)

(58) Field of Classification Search
CPC .. H04L 67/104; H04W 8/005; H04W 68/005; H04W 74/002; H04W 76/023; H04W 84/18; H04W 76/14
See application file for complete search history.

(56) References Cited

U.S. PATENT DOCUMENTS

2004/0063442 A1   4/2004   Goldberg
2010/0284387 A1   11/2010  Zhao et al.
(Continued)

FOREIGN PATENT DOCUMENTS

CN   101043753 A   9/2007
CN   102413549 A   4/2012
(Continued)

OTHER PUBLICATIONS

"IEEE Standard for Information technology—Telecommunications and information exchange between systems Local and metropolitan area networks—Specific Requirements Part 11: Wireless LAN Medium Access Control (MAC) and Physical Layer (PHY) Specifications," IEEE Std 802.11-2012, Mar. 29, 2012, 2793 pages.
(Continued)

*Primary Examiner* — Walli Butt
(74) *Attorney, Agent, or Firm* — Slater Matsil, LLP

(57) ABSTRACT

A method for operating a first station configured to transmit data includes transmitting during a paging window, a first frame to page a second station, the first frame including an identifier associated with the second station, and generating a second frame including first timing information for a first time period to be subscribed by the first station for transmitting data to the second station, the first time period occurring after the paging window. When a third frame is received after a pre-specified short interval after transmitting the first frame, the third frame acknowledging the first frame, the method includes transmitting the second frame after the pre-specified short interval after receiving the third frame, and transmitting the data during the first time period.

10 Claims, 12 Drawing Sheets

(51) Int. Cl.
*H04W 8/00* (2009.01)
*H04W 68/00* (2009.01)
*H04W 74/00* (2009.01)
H04W 76/14 (2018.01)
H04W 84/18 (2009.01)

(52) U.S. Cl.
CPC .......... *H04W 74/002* (2013.01); *H04W 76/14* (2018.02); *H04W 84/18* (2013.01)

(56) References Cited

U.S. PATENT DOCUMENTS

| | | | |
|---|---|---|---|
| 2014/0126442 A1 | 5/2014 | Jafarian et al. | |
| 2014/0169290 A1* | 6/2014 | Seok | H04W 4/70 370/329 |
| 2015/0055546 A1* | 2/2015 | Jafarian | H04W 28/02 370/315 |
| 2015/0071051 A1* | 3/2015 | Zhu | H04W 72/121 370/216 |
| 2015/0117285 A1 | 4/2015 | Xie et al. | |
| 2016/0119894 A1* | 4/2016 | Patil | H04W 8/005 455/515 |
| 2016/0165653 A1 | 6/2016 | Liu et al. | |
| 2016/0174136 A1* | 6/2016 | Patil | H04L 12/18 370/312 |
| 2016/0286574 A1 | 9/2016 | Abraham et al. | |
| 2017/0164327 A1 | 6/2017 | Patil et al. | |
| 2018/0049123 A1* | 2/2018 | Park | H04W 52/0216 |

FOREIGN PATENT DOCUMENTS

| | | |
|---|---|---|
| CN | 102740422 A | 10/2012 |
| CN | 102821466 A | 12/2012 |
| CN | 103379593 A | 10/2013 |
| EP | 1418686 A2 | 5/2004 |
| WO | 2010028605 A1 | 3/2010 |
| WO | 2014109874 A1 | 7/2014 |

OTHER PUBLICATIONS

"Part 11: Wireless LAN Medium Access Control (MAC) and Physical Layer (PHY) Specifications," IEEE Standard for Information Technology-Telecommunications and Information Exchange Between Systems Local and Metropolitan Area Networks-Specific Requirements, IEEE Std 802.11, Mar. 29, 2012, pp. 1-2793.
Zhang, et al., "TMMAC: An Energy Efficient Multi-Channel MAC Protocol for Ad Hoc Networks," 2007 IEEE, 8 pages.
Liu, et al., "A Power-saving Scheduling for IEEE 802.11 Mobile Ad Hoc Network," [no date], 8 pages.
Wu, et al., "An Energy Efficient MAC Protocol for IEEE 802.11 WLANs," [no date], 9 pages.

* cited by examiner

METHOD AND SYSTEM FOR TRANSMITTING DATA AMONG PEER STATIONS IN A DECENTRALIZED MANNER WITH HIGH CHANNEL EFFICIENCY This application claims the benefit of U.S. Provisional Application No. 62/165,640, filed on May 22, 2015, entitled "Method and System for Transmitting Data among Peer Stations in a Decentralized Manner with High Channel Efficiency," which application is hereby incorporated herein by reference.

TECHNICAL FIELD

The present invention relates to digital communications, and, in particular embodiments, to a system and method for transmitting data among peer stations in a decentralized manner with high channel efficiency.

BACKGROUND

The Institute of Electrical and Electronics Engineers (IEEE) Standard 802.11 is a set of media access control (MAC) and physical layer (PHY) specifications for implementing wireless local area network (LAN) or wireless fidelity (Wi-Fi) communication in the 2.4, 3.6, 5, and 60 GHz frequency bands. A basic service set (BSS) provides the basic building-block of an 802.11 wireless LAN. In an infrastructure mode of 802.11, a single access point (AP) together with all associated stations (STAs) is called a BSS. A station (STA) is also sometimes referred to as a device. Thus, these two terms are interchangeable. The AP acts as a master to control the STAs within that BSS. The simplest infrastructure BSS consists of one AP and one STA.

Currently, three important market trends drive the future evolution of Wi-Fi technology towards proximity-based device-to-device networking and data exchange. The first trend is the increasing geographic density of Wi-Fi-capable devices as the Wi-Fi technology continues to penetrate the mobile and consumer electronics markets. Metcalfe's law states that the value of a telecommunications network is proportional to the square of the number of compatible communicating devices participating in that network. Therefore, a high density of Wi-Fi devices increases the utility of Wi-Fi based device-to-device networking. The second trend is the growing popularity of social networking applications, many of which are proximity based, making smartphones, tablets, and other mobile devices the natural choices as the hardware platforms for these social networking applications. The third trend is the emerging mobile health, smart home, smart building, Internet of Things (IoT), etc., which will increase data traffic among devices in the proximity.

Although the IEEE 802.11 Standards define an independent BSS (IBSS) mode wherein two or more STAs can directly communicate with each other without direct intervention from a controlling AP, the IBSS mode doesn't scale well when the number of STAs becomes large and it also restricts to a single channel data operation. The IEEE 802.11s Amendment also defines an architecture and protocol that supports the mesh network. However, an IEEE 802.11s compliant mesh network requires high power consumption due to un-synchronized beacons and significant signaling overhead during topology change, making it unsuitable for devices running on battery power or in a high density or non-stationary environment.

A neighbor awareness networking (NAN) certification program has been initiated by the Wi-Fi Alliance to provide IEEE 802.11 technology a low-power mechanism that is executed in the background of compliant devices to make the compliant devices neighbor aware. NAN, which is based on proximity, does not require the real-time connection to a Wi-Fi infrastructure, servers, GPS or other geo-location, but instead uses direct device-to-device Wi-Fi to discover and exchange information. The NAN Release 1 (NAN1) specification has been published by the Wi-Fi Alliance and enables mobile devices to efficiently discover people and services in their proximity. The Wi-Fi Alliance is currently working on NAN Release 2 (NAN2) specification by introducing many-to-many data connectivity, along with other enhancement features such as accurate ranging and privacy protection. It is envisioned that the typical applications for NAN include Wi-Fi based mobile social networking, mobile commerce, mobile advertising, wireless multi-player gaming, group chatting, etc.

SUMMARY OF THE DISCLOSURE

Example embodiments provide a system and method for transmitting data among peer stations in a decentralized manner with high channel efficiency.

In accordance with an example embodiment, a method for operating a first station configured to transmit data is provided. The method includes transmitting, by the first station during a paging window, a first frame to page a second station, the first frame including an identifier associated with the second station, and generating, by the first station, a second frame including first timing information for a first time period to be subscribed by the first station for transmitting data to the second station, the first time period occurring after the paging window. When a third frame is received after a pre-specified short interval after transmitting the first frame, the third frame acknowledging the first frame, the method includes transmitting, by the first station, the second frame after the pre-specified short interval after receiving the third frame, and transmitting, by the first station, the data during the first time period.

In accordance with an example embodiment, a method for operating a station configured to receive data is provided. The method includes receiving, by the station during a paging window, a first frame including a first identifier associated with the station and first timing information for a time period for receiving data, the time period occurring after the paging window, storing, by the station, the first timing information, and receiving, by the station, the data during the time period.

In accordance with an example embodiment, a first station adapted for transmitting data is provided. The first station includes a processor, and a computer readable storage medium storing programming for execution by the processor. The programming including instructions to configure the first station to transmit during a paging window, a first frame to page a second station, the first frame including an identifier associated with the second station, generate a second frame including first timing information for a first time period to be subscribed by the first station for transmitting data to the second station, the first time period occurring after the paging window, and when a third frame is received after a pre-specified short interval after the first frame is transmitted, the third frame acknowledging the first frame, transmit the second frame after the pre-specified short interval after receiving the third frame, and transmit the data during the first time period.

In accordance with an example embodiment, a station adapted for receiving data is provided. The station includes a processor, and a computer readable storage medium storing programming for execution by the processor. The programming including instructions to configure the station to receive during a paging window, a first frame including a first identifier associated with the station and first timing information for a time period for receiving data, the time period occurring after the paging window, store the first timing information, and receive the data during the time period.

In accordance with an example embodiment, a method for operating a first station configured to protect a shared communications channel from a second station is provided. The method includes transmitting, by the first station during a paging window, a Paging frame including a first Duration field set to a first value equal to a sum of durations of a Paging Acknowledgement (PA) frame, a Timing frame, a Timing Acknowledgement (TA) frame, and three short interframe intervals (SIFSs), wherein the first value indicates that the shared communications channel is inaccessible to the second station for a duration spanning the end of the Paging frame to the end of the TA frame, receiving, by the first station, the PA frame including a second Duration field containing a second value indicating that the shared communications channel is inaccessible to the second station for a duration spanning the end of the PA frame to the end of the TA frame, and transmitting, by the first station, the Timing frame including a third Duration field set to a third value equal to a lesser of a maximum allowed duration and a duration spanning the end of the Timing frame to the end of a time period to be subscribed by the first station for transmitting data to a third station, wherein the third value indicates that the shared communications channel is inaccessible to the second station for the duration of the third value after the end of the Timing frame, and wherein the time period occurs after the paging window.

Practice of the foregoing embodiments enables a reduction in wake time of receiving stations waiting for transmissions thereby extending the battery life of such stations.

Furthermore, the practice of the foregoing embodiments reduce channel contention in transmitting stations, which results in less wake time for the transmitting stations, as well as reduction in network resource consumption.

BRIEF DESCRIPTION OF THE DRAWINGS

For a more complete understanding of the disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to systems and methods for data communications among peer stations. For example, a first station transmits during a paging window, a first frame to page a second station, the first frame including an identifier associated with the second station, and generates a second frame including first timing information for a first time period to be subscribed by the first station for transmitting data to the second station, the first time period occurring after the paging window. When a third frame is received within a pre-specified short interval after transmitting the first frame, where the third frame acknowledges the first frame, the first station also transmits the second frame within the pre-specified short interval after receiving the third frame, and transmits the data during the first time period.

The embodiments will be described with respect to example embodiments in a specific context, namely communications systems that support device to device communications. The embodiments may be applied to standards compliant communications systems, such as those that are compliant with Third Generation Partnership Project (3GPP), IEEE 802.11, and the like, technical standards, and non-standards compliant communications systems, that support device to device communications.

Figure 1:
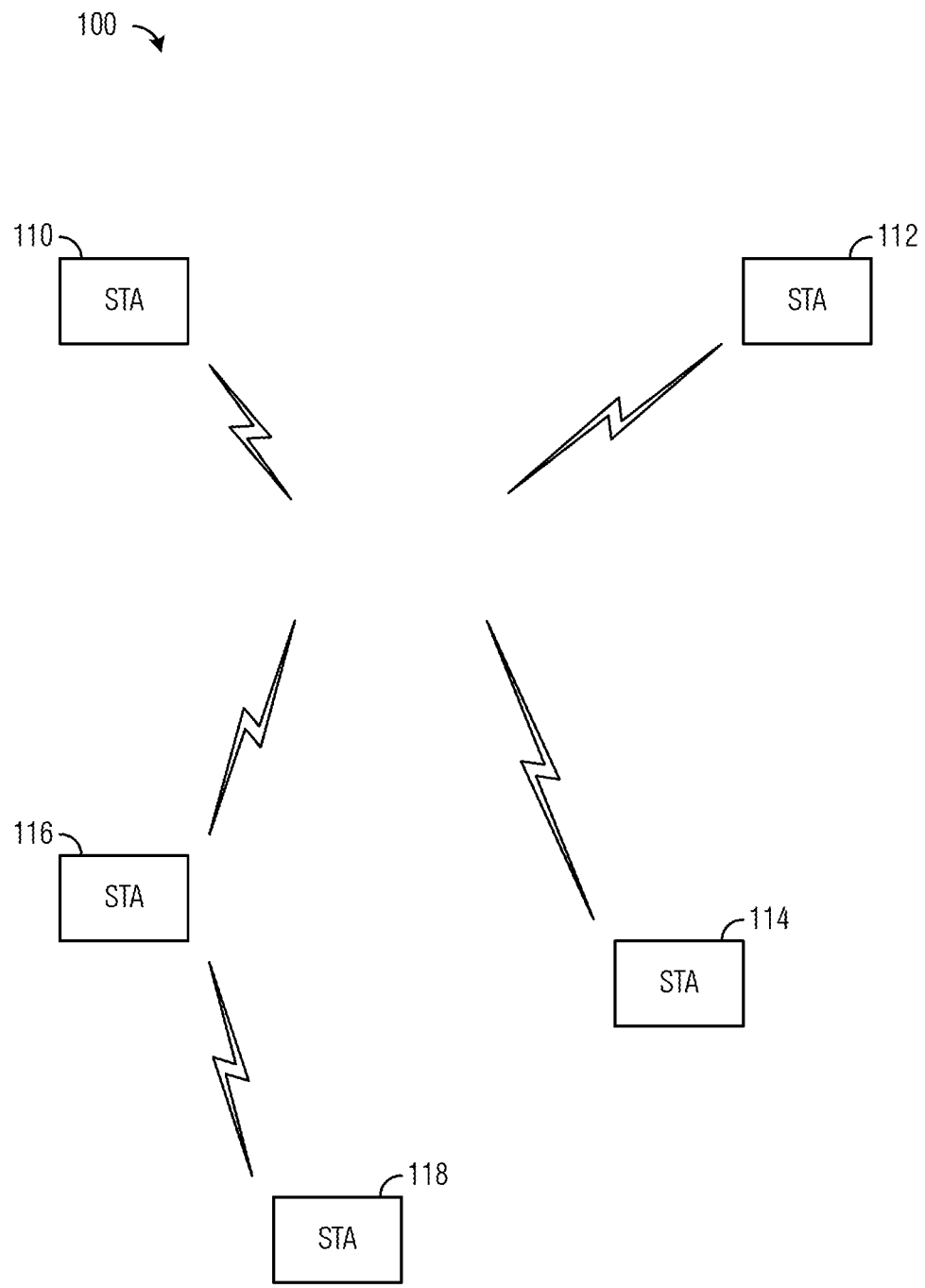
FIG. 1 illustrates an example communications system.

FIG. 1 illustrates a first example communications system 100. Communications system 100 includes a plurality of stations (STAs), such as STA 110, STA 112, STA 114, STA 116, and STA 118. A STA may also be commonly referred to as a user equipment (UE), a mobile station, a mobile, a user, a subscriber, a terminal, a device, a communications device, and the like. In communications system 100, a first STA may transmit a frame directly to a second STA without going through a centralized entity such as an access point. While it is understood that communications systems may employ any number of STAs, only five STAs are illustrated for simplicity.

As stated before, one objective that the Wi-Fi Alliance is trying to achieve with the NAN Release 2 (NAN2) program is to provide proximity based device-to-device data connectivity with low power consumption. Therefore, a power saving mechanism for channel access during the NAN2 data operation is needed.

Figure 2:
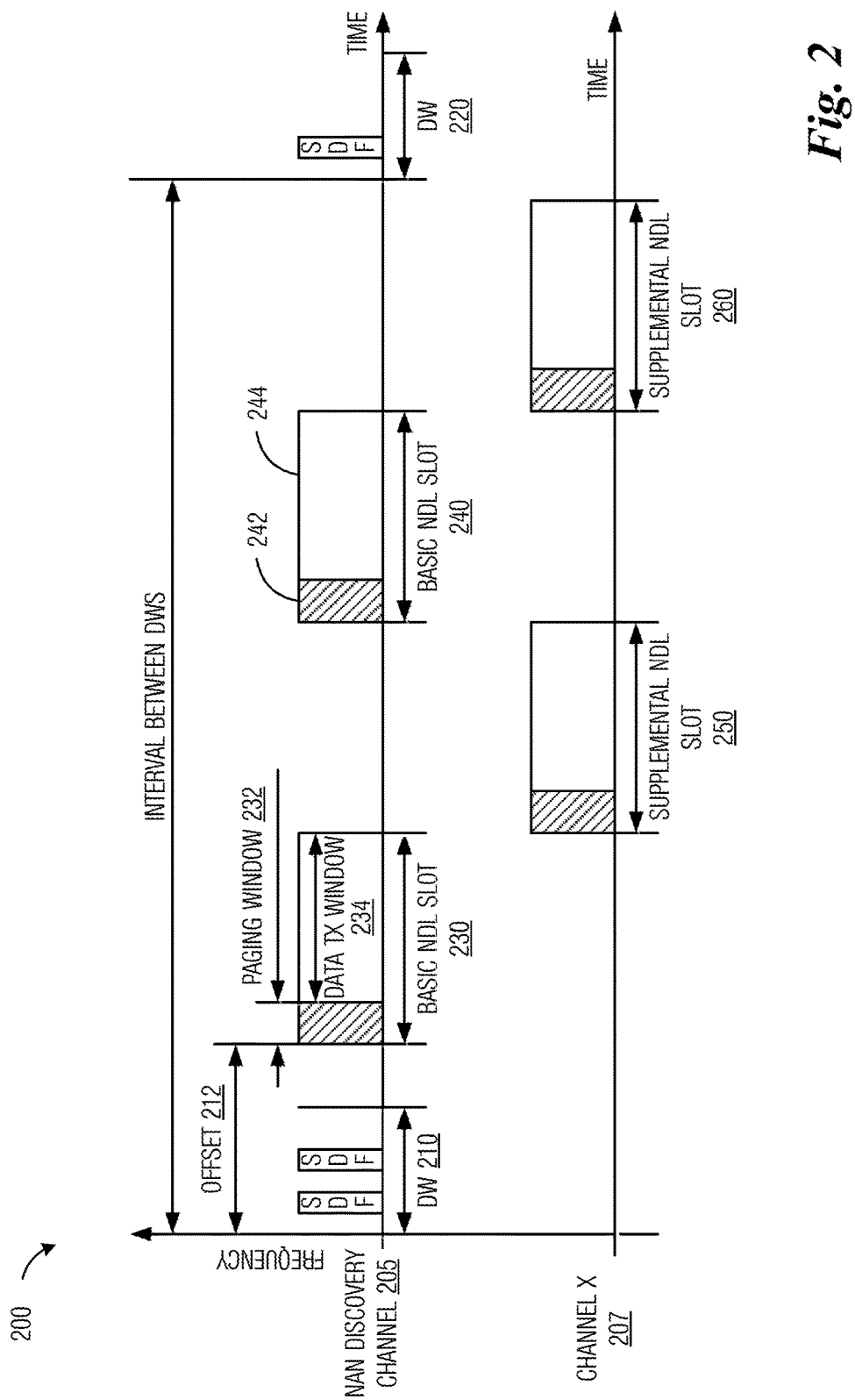
FIG. 2 illustrates an example embodiment of NAN discovery and NAN data link operation.

FIG. 2 illustrates an example operation 200 of neighbor awareness networking (NAN) discovery and NAN data link (NDL), wherein a sequence of NAN Discovery Windows (DWs) are used for NAN discovery and a sequence of NDL Slots are used for NAN data link. In order to enable NAN devices to discover a service or be discovered, a sequence of NAN Discovery Windows (DWs) with a fixed interval in between, such as DW 210 and DW 220 as shown in FIG. 2, are provisioned on a NAN Discovery Channel 222 using the synchronization mechanism specified in the Wi-Fi Alliance NAN Release 1 (NAN1) Technical Specification. As an example, the NAN Discovery channel on the 2.4 GHz band is the IEEE 802.11-defined Channel 6. A NAN device may contend for the NAN Discovery channel during a DW for sending a Service Discovery frame (SDF) in order to publish or subscribe a service.

In order to facilitate power efficient communication between devices, one or more Basic NDL Slots, such as Basic NDL Slot 230 and Basic NDL Slot 240 as shown in FIG. 2, are provisioned on NAN Discovery Channel 222 between two consecutive DWs, where two or more NAN devices may rendezvous. A Basic NDL Slot may be used for exchanging management messages, such as messages related to group formation, data link setup and parameters negotiation, allocation of Supplemental NDL Slot(s), channel switch announcement, authentication, security key distribution, association request, association response, de-authentication, de-association, and the like. A Basic NDL Slot may also be used for exchanging data. Different Basic NDL Slots may be used to serve different services or categories of services, respectively. Alternatively, one Basic NDL Slot may be used to serve different services or categories of services. One service may use multiple Basic NDL Slots.

The time offset from the beginning of the DW to the beginning of the first Basic NDL Slot within the same DW Interval, e.g., an offset 242, may be algorithmically derived from a parameter, such as a parameter of a NAN cluster, a NAN data group, a service or a category of services that the Basic DNL Slot supports, or a combination thereof. Therefore, the parameter may be a NAN cluster identifier (ID), a NAN data group ID, a service name, a hash of a service name, a service ID, a service category, or a combination thereof. A subsequent Basic NDL Slot serving the same service or category of services may be a fixed and pre-specified interval later. Alternatively, the time offset from the beginning of the DW to the beginning of the first Basic NDL Slot within the same DW Interval may be determined by the corresponding service publisher and announced during the DW when the service publisher is advertising the service. However, it may be desirable to avoid or to minimize the signaling overhead required to operate a Basic NDL Slot.

When the allocation of Basic NDL Slot(s) is not sufficient for the data traffic of a particular service or a particular NAN device participating in the data group, additional Supplemental NDL Slot(s), such as Supplemental NDL Slot 250 and Supplemental NDL Slot 260 in FIG. 2, may be provisioned. The Supplemental NDL Slots may be allocated on the NAN Discovery channel or other Wi-Fi frequency channels (such as Channel X 262 in FIG. 2). The messages for allocating Supplemental NDL Slot(s) may be conveyed using the Basic NDL Slots. This will allow much greater flexibility for allocating the time and frequency resources for the Supplemental NDL Slots and for negotiating other parameters, such as access related parameters, security related parameters, and the like, for operating the Supplement NDL Slots. It may be undesirable to convey the messages for allocating the Supplemental NDL Slot(s) during the DWs, as they may jam the channel during the DWs and compromise the performance for system synchronization and for service discovery, which are the two primary purposes of the DWs.

The design of a combination of Basic NDL Slots, which use a simple allocation scheme with low or no signaling overhead, and the optional Supplemental NDL Slots, which offer much greater flexibility and are allocated only when needed, helps to meet the needs of a wide variety of real-world usage scenarios for NAN2 data communications.

As shown in FIG. 2, each Basic NDL Slot (such as Basic NDL Slot 240) and Supplemental NDL Slot (such as Supplemental NDL Slot 250) has the same structure, which consists of a Paging Window (such as Paging Window 242) and a Data Transmission (Tx) Window (such as Data Transmission Window 244) in that order. In order to save power, a STA may enter a power saving mode after the DW. However, all STAs wake up during the Paging Windows of their associated Basic NDL Slot(s), and of their associated Supplemental NDL Slot(s) (if there are any), in order to transmit or receive a paging message.

A paging message in a Paging Window is used by a data source STA (i.e., a STA transmitting data) to inform one or more target data sink STAs (i.e., STAs targeted for receiving the data) of a pending data transmission during a Data Transmission Window (such as Data Transmission Window 244) immediately following the Paging Window (such as Paging Window 242). A paging message includes an identifier of each target data sink STA or a group identifier that identifies a group of target data sink STAs. If a STA doesn't receive any paging message targeted for it (or for its group) during a Paging Window, it may enter a power saving mode at the end of the Paging Window until the next associated Paging Window (of an associated Basic NDL Slot and/or an associated Supplemental NDL Slot) or the next DW, whichever comes first, as the STA is not expecting to receive any data during the Data Transmission Window immediately following the Paging Window (in which it did not receive a paging message targeted for it).

A STA successfully receiving a Paging frame targeted for it or for its group during a Paging Window may transmit a Paging Acknowledgement (PA) frame back to the corresponding source STA within a pre-specified short interval (such as a short inter-frame space (SIFS) defined in the IEEE 802.11 Standards) in the same Paging Window. A source STA that has sent a Paging frame during a Paging Window but has not received a corresponding PA frame within the pre-specified short interval may enter a power saving mode at the end of the Paging Window until the next associated Paging Window (of an associated Basic NDL Slot and/or an associated Supplemental NDL Slot) or the next DW, whichever comes first, as the source STA may determine that there is no sink STA in the proximity to receive the data, therefore, that there is no need to transmit the data.

Figure 3:
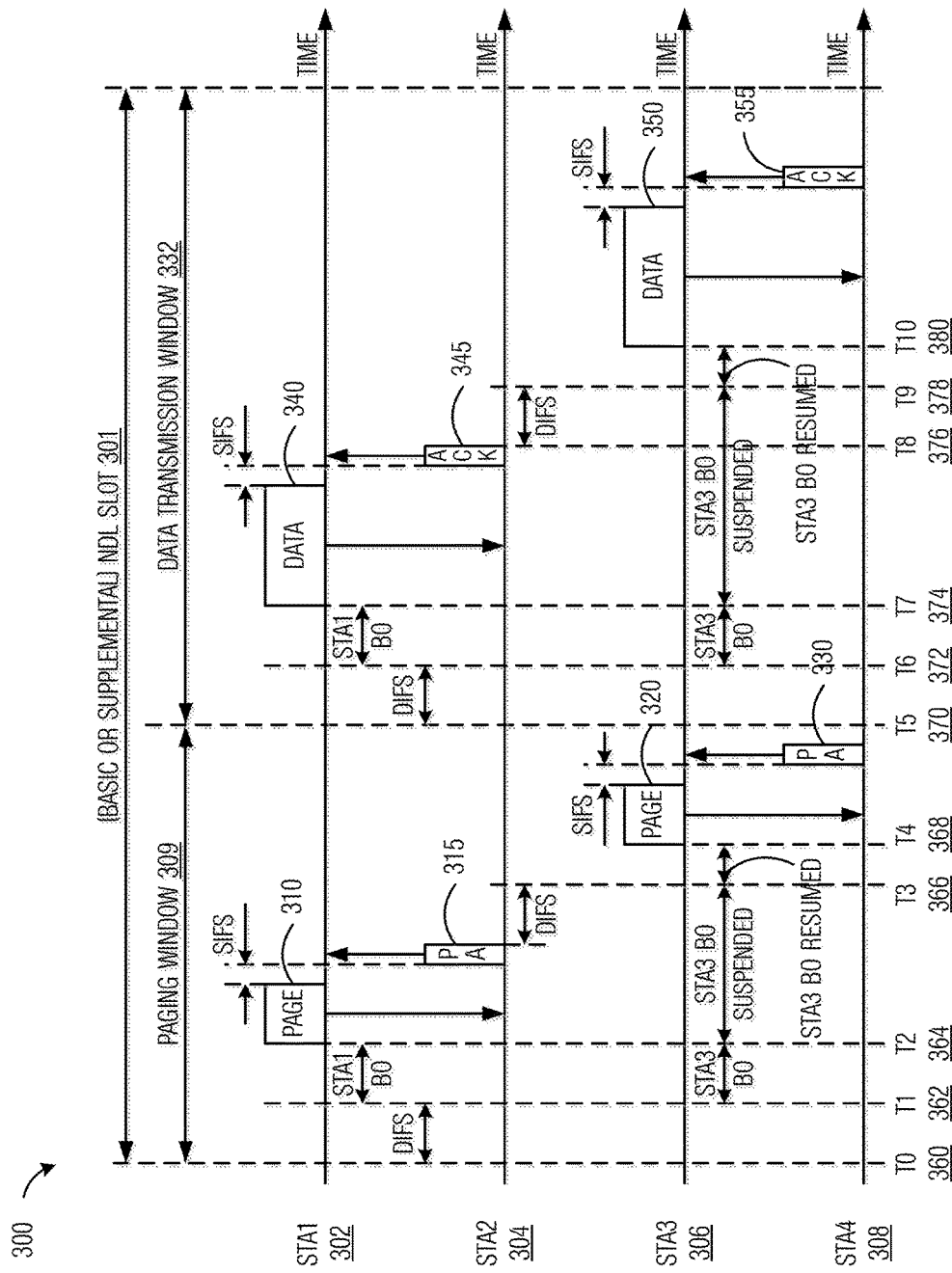
FIG. 3 illustrates an example embodiment of operations within a NAN data link (NDL) slot wherein a data transmitting station contends for the channel both when transmitting a Paging frame and when transmitting the data.

FIG. 3 illustrates an example embodiment of operations 300 occurring during an NDL Slot 301, which may be an example of Basic NDL Slot 230 and Supplemental NDL Slot 250 in FIG. 2. Operations 300 may be indicative of operations occurring in one or more STAs as the STAs participate in direct STA-to-STA communications. As shown in FIG. 3, at time T0 360, which marks the beginning of the Paging Window 309 of the NDL slot 301, a plurality of STAs, such as STA1 302, STA2 304, STA3 306, and STA4 308, wake up. STA1 302 has a data (such as DATA 340) to be sent to STA2 304 and STA3 306 has a data (such as DATA 350) to be sent to STA4 308. Thus, STA1 302 generates a Paging frame (such as PAGE 310) including an identifier of STA2 304. Similarly, STA3 306 generates a Paging frame (such as PAGE 320) including an identifier of STA4 308.

The generation of Paging frames PAGE 310 and PAGE 320 trigger STA1 302 and STA3 306, respectively, to start a channel contention procedure by initiating a random value on a backoff (BO) timer and detecting if the channel has been idle for a time period that equals to a distributed inter-frame space (DIFS) as defined in the IEEE 802.11 Standards. At time T1 362, each of STA1 302 and STA3 306 detects that the channel has been idle for a DIFS period and starts to count down its backoff timer at a constant and pre-specified rate until it detects that the channel becomes busy or its backoff timer reaches zero, whichever comes first. At time T2 364 in the particular example illustrated in FIG. 3, STA1 302 wins the channel contention by counting its backoff timer down to zero first and transmits PAGE 310. STA3 306 detects that the channel becomes busy and suspends counting down of its backoff timer.

STA2 304 receives PAGE 310 successfully, and then STA2 304 may transmit a PA frame (such as PA 315) to STA1 302 after waiting for a short inter-frame interval (SIFS) as defined in the IEEE 802.11 Standards. In order for STA3 306 to resume counting down its backoff time, STA3 306 needs to detect that the channel has been idle for a DIFS period again. STA3 306 can't resume counting down its backoff timer during the idle period that is between PAGE 310 and PA 315 because a SIFS is shorter than a DIFS. The transmission of PA 315 by STA2 304 resets STA3 306's attempt of detecting that the channel has been idle for a DIFS period. STA3 306 has to wait until time T3 366, which is one DIFS period after the end of PA 315, before it can resume counting down its backoff time. Eventually, at time T4 368, STA3 306 counts down its backoff timer to zero and transmits PAGE 320. STA4 308 receives PAGE 320 successfully, and then waits for a SIFS period before transmitting a PA frame (such as PA 330) to STA3 306.

At time T5 370, which marks the beginning of the Data Transmission Window 332 of the same NDL slot 301, in order to transmit its data, each of STA1 302 and STA3 306 starts a second channel contention procedure by initiating a second random value on its backoff timer and detecting if the channel has been idle for a DIFS period. Meanwhile, STA2 304 and STA4 308 stay awake in order to receive their respective data. At time T6 372, each of STA1 302 and STA3 306 detects that the channel has been idle for a DIFS period and starts to counting down its backoff timer. At time T7 374 in the particular example illustrated in FIG. 3, STA1 302 wins the channel contention again and transmits DATA 340. STA3 306 detects that the channel becomes busy and suspends counting down of its backoff timer. STA2 304 receives DATA 340 successfully, and then waits for a SIFS period before transmitting an acknowledgement (ACK) frame (such as ACK 345) to STA1 302. STA3 306 waits until time T9 378, which is one DIFS period after the end of ACK 345, before it can resume counting down its backoff time. Eventually, at time T10 380, STA3 306 counts down its backoff timer to zero and transmits DATA 350. STA4 308 receives DATA 350 successfully, and then STA4 308 may transmit an acknowledgement frame (such as ACK 355) to STA3 306 after waiting for a SIFS period.

From the viewpoints of power consumption and channel efficiency, there are several drawbacks present in operations 300. First, the data source STAs (such as STA1 302 and STA3 306) need to contend for the channel not only when transmitting the Paging frame, but also when transmitting the data. Contending for the channel is power consuming for a STA, as the STA is usually not in a power saving mode when contending for the channel for a transmission. Therefore, contending for the channel twice causes more power consumption for the source STAs. Furthermore, as for a data sink STA (such as STA2 304 and STA4 308), which has received a valid Paging frame during the Paging Window, it has to keep awake after the Paging Window 309 until it receives its data, because it doesn't know when its corresponding source STA will gain the channel access through wining the channel contention and start to transmit data. In the example illustrated in FIG. 3, STA2 304 has to stay awake between T5 370 and T7 374 and STA4 308 has to stay awake between T5 370 and T10 380, even though there is no data transmission to them during those time intervals. An excessive waiting period after the Paging Window may waste the battery power for the sink STAs. Secondly, the channel utilization efficiency (or channel efficiency) during the channel contention is also low due to the random backoff periods used for avoiding collisions and the DIFS waiting periods before a STA can start or resume its random backoff. In the example illustrated in FIG. 3, the channel is not utilized for transmissions between T5 370 and T7 374 and between T8 376 and T10 380 for these reasons.

In a high density environment, which is required for NAN2 to be able to scale well, all these matters of low power efficiency on a data source STA and on a data sink STA, and low channel utilization efficiency will become worse due to the elevated probability of collisions and the prolonged maximum window size for the random backoff in response to the elevated collision probability. Under this circumstance, doubling the number of channel contentions by requiring a data source STA to contend for the channel twice (i.e., when transmitting the paging message and when transmitting the data) will only make all matters even worse. So, it is desirable for the same data source STA to avoid contending for the channel for the second time when transmitting the data during the Data Transmission Window.

According to an example embodiment, a method for allowing a transmitting device to avoid having to contend for the channel twice is disclosed herein. According to an aspect of the example embodiments, a data source STA may contend for the channel for transmitting a paging message to one or more data sink STAs during a Paging Window. The paging message may include one or more identifiers of the data sink STA(s), wherein each identifier may be an individual identifier or a group identifier. Then, the data source STA may determine if it receives a PA frame within a pre-specified short interval (such as a SIFS) acknowledging the reception of the paging message. If the data source STA doesn't receive the PA frame, the data source STA may consider that the paging message has failed or there is no data sink STA in the proximity. Therefore, it may abort the attempt of paging and transmitting the data to the data sink STA(s). Alternatively, the data source STA may re-transmit the paging message at a later time, which requires the data source STA to perform and to win the channel contention again. If the data source STA receives the PA frame, it may transmit a Timing frame including the timing information specifying a time period occurring during a Data Transmission Window immediately following the Paging Window for transmitting a data to the data sink STA(s). After successfully transmitting the Timing frame, the data source STA may transmit the data to the data sink STA(s) during the specified time period without the need of contending for the channel for a second time. Furthermore, during the Data Transmission Window, the data sink STA, having received the paging message, is awake during the specified time period to receive the data.

Figure 4:
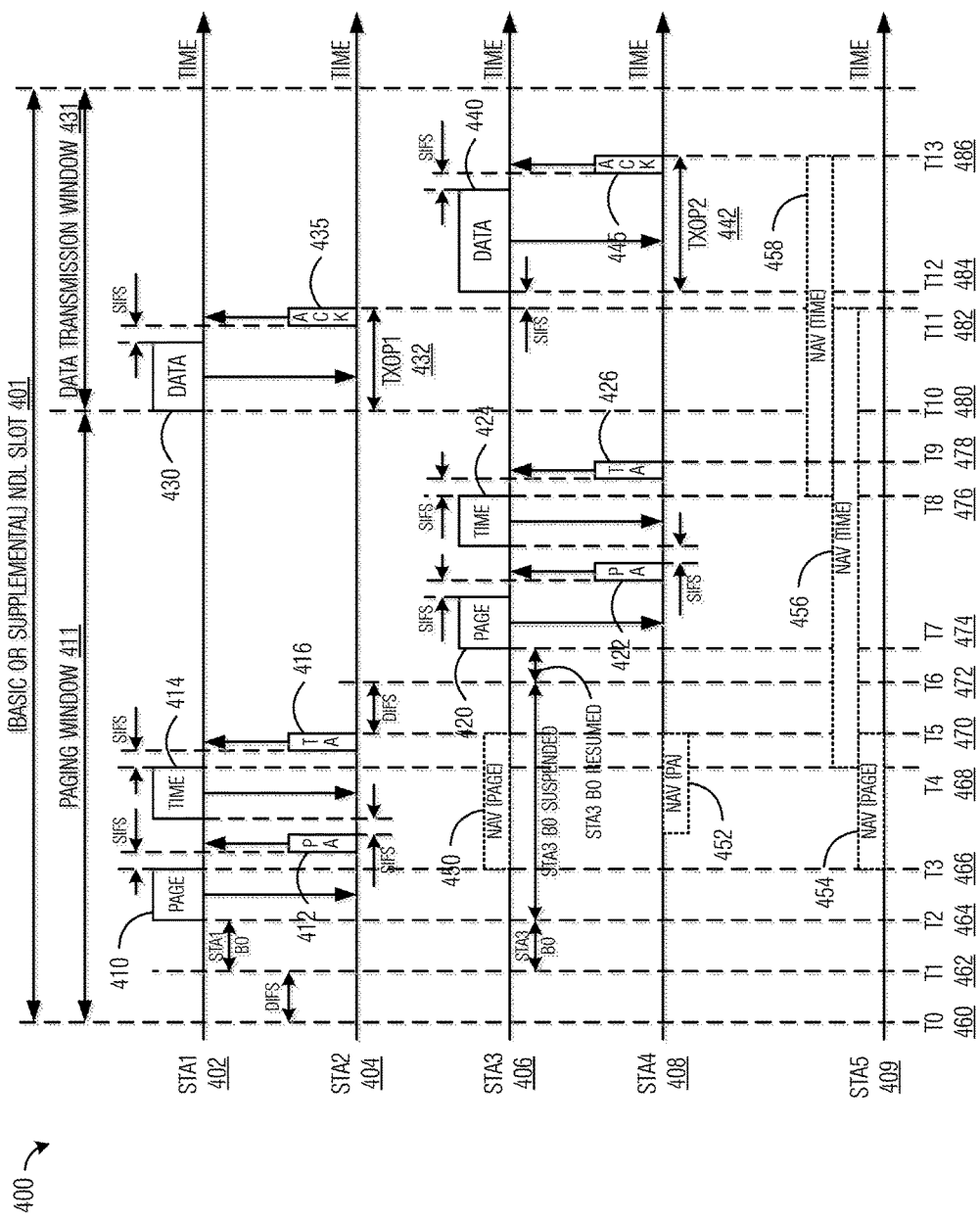
FIG. 4 illustrates an example embodiment of enhanced operations within a NAN data link (NDL) slot in accordance with example embodiments disclosed herein.

FIG. 4 illustrates an example embodiment of enhanced operations 400 occurred during an NDL slot 401, which may be an example of Basic NDL Slot 230 or Supplemental NDL Slot 250 in FIG. 2. Operations 400 may be indicative of operations occurring in one or more STAs as the STAs participate in direct STA-to-STA communications. As shown in FIG. 4, at time T0 460, which marks the beginning of the Paging Window 411 of the NDL slot 401, a plurality of NAN2 STAs (i.e., 802.11 STAs that are compliant with the Wi-Fi Alliance NAN2 standard), such as STA1 402, STA2 404, STA3 406, and STA4 408, wake up. STA1 402 has a data (such as DATA 430) to be sent to STA2 404 and STA3 406 has a data (such as DATA 440) to be sent to STA4 408. STA1 402 generates a Paging frame (such as PAGE 410) including an identifier of STA2 404. The identifier is used to identify the STA(s) (such as STA2 404) that needs to be awake during the specified time period to receive the data (such as DATA 430) and to transmit an Acknowledgement (ACK) frame (such as ACK 435). PAGE 410 may further include a Duration field in the MAC header. The Duration field in the MAC header of PAGE 410 is set to a value equal to the sum of the durations of a PA frame (such as PA 412), a Timing frame (such as TIME 414), a Timing Acknowledgement (TA) frame (such as TA 416), and three SIFSs.

According to the IEEE 802.11 Standards, a virtual channel sensing (CS) function is provided by the media access control (MAC) layer of the IEEE 802.11 compliant communications system using a network allocation vector (NAV). NAV is an indicator, maintained by each Wi-Fi STA and AP, of time periods when transmission onto the wireless channel is not to be initiated by the STA or AP. Any Wi-Fi STA or AP receiving a valid frame where the value in the Address 1 field, which is also known as the Receiver Address (RA) field, in the MAC header of the frame is not the MAC address of the STA or AP should update its NAV with the value received in the Duration field in the MAC header of the frame. The NAV may be thought of as a counter, which counts down to 0 at a uniform rate. When the counter is 0, the virtual CS function indicates that the wireless channel is idle; when nonzero, the wireless channel is busy, thus can't be accessed.

Therefore, by setting the Duration field in the MAC header of PAGE 410 to a value equal to the sum of the durations of a PA frame (such as PA 412), a Timing frame (such as TIME 414), a Timing Acknowledgement (TA) frame (such as TA 416), and three SIFSs, STA1 402 protects the remaining steps of the paging exchanges that it has initiated, meaning that, once it wins the channel contention and transmits PAGE 410, it has the right of using the channel to complete the remaining steps of the paging exchanges, including receiving a PA frame (such as PA 412), transmitting a Timing frame (such as TIME 414) and receiving a TA frame (such as TA 416).

Similarly, STA3 406 generates a Paging frame (such as PAGE 420) to be sent to STA4 408. PAGE 420 may include a Duration field in the MAC header and an identifier of STA4 408. The Duration field in the MAC header of PAGE 420 is set to a value equal to the sum of durations of frames PA 422, TIME 424, TA 426, and three SIFSs to protect the remaining steps of the paging exchanges that STA3 406 initiates.

The generation of Paging frames PAGE 410 and PAGE 420 trigger STA1 402 and STA3 406, respectively, to start a channel contention procedure by each initiating a random value on its backoff timer and detecting if the channel has been idle for a DIFS period. At time T1 462, each of STA1 402 and STA3 406 detects that the channel has been idle for a DIFS period and starts to count down its backoff (BO) timer at a constant and pre-specified rate until it detects that the channel becomes busy or its backoff timer reaches zero, whichever comes first. At time T2 464 in the particular example illustrated in FIG. 4, STA1 402 wins the channel contention by counting its backoff timer down to zero first and transmits PAGE 410 (which is acknowledged by PA 412). STA3 406 detects that the channel becomes busy, thus suspends the counting down of its backoff timer. If STA3 406 is able to further decode PAGE 410 correctly, it may set its NAV counter to the value in the Duration field in the MAC header of PAGE 410 as explained before. Block 450 in FIG. 4 illustrates the time period during which the NAV counter of STA3 406 has a non-zero value, indicating that the channel is busy and can't be accessed.

A pre-specified short interval (such as a SIFS) after successfully receiving PAGE 410, STA2 404 transmits a PA frame (such as PA 412) to STA1 402 to acknowledge the reception of PAGE 410. PA 412 may include a Duration field in the MAC header. The Duration field in the MAC header of PA 412 is set to a value equal to the value in the Duration field in the MAC header of PAGE 410 (which PA 412 is sent to acknowledge) minus the sum of the durations of PA 412 and a SIFS. This ensures that the Duration field in PA 412 provides the protection to the same end point of the paging exchanges as the Duration field in PAGE 410 does. Block 452 in FIG. 4 illustrates the time period during which the NAV counter of STA4 408 has a non-zero value. In FIG. 4, the NAV counter of STA4 408 is set by the Duration field in PA 412, instead of that in PAGE 410, probably because STA4 408 is a hidden node to (meaning it can't receive from) STA1 402, but not a hidden node to STA2 404. It should be noted that when a data source STA pages multiple data sink STAs in a single Paging frame, not every data sink STA being paged has to send a PA frame back. As an illustrative example, if a data sink STA's MAC address matches with the MAC address contained in the Receiver Address (RA) field in the MAC header of a received Paging frame, then this data sink STA is responsible for sending a PA frame back to the data source STA. Then, the rest of the data sink STAs being paged are not responsible for sending a PA frame. As another illustrative example, a data source STA may indicate in the Paging frame which data sink STA is responsible for sending a PA frame back to the data source STA by including an identifier of that data sink STA in a special field in the Paging frame or by putting the identifier of that data sink STA on the top of a list of identifiers of the data sink STAs being paged. Then, the rest of the data sink STAs being paged are not responsible for sending a PA frame.

A pre-specified short interval (such as a SIFS) after successfully receiving PA 412, STA1 402 transmits a Timing frame (such as TIME 414), the Timing frame including the timing information specifying a time period, referred to as a transmission opportunity (TXOP) (such as TXOP1 432 occurring between time points T10 480 and T11 482 in FIG.

4), occurring during the Data Transmission (Tx) Window immediately following the Paging Window.

Figure 5:
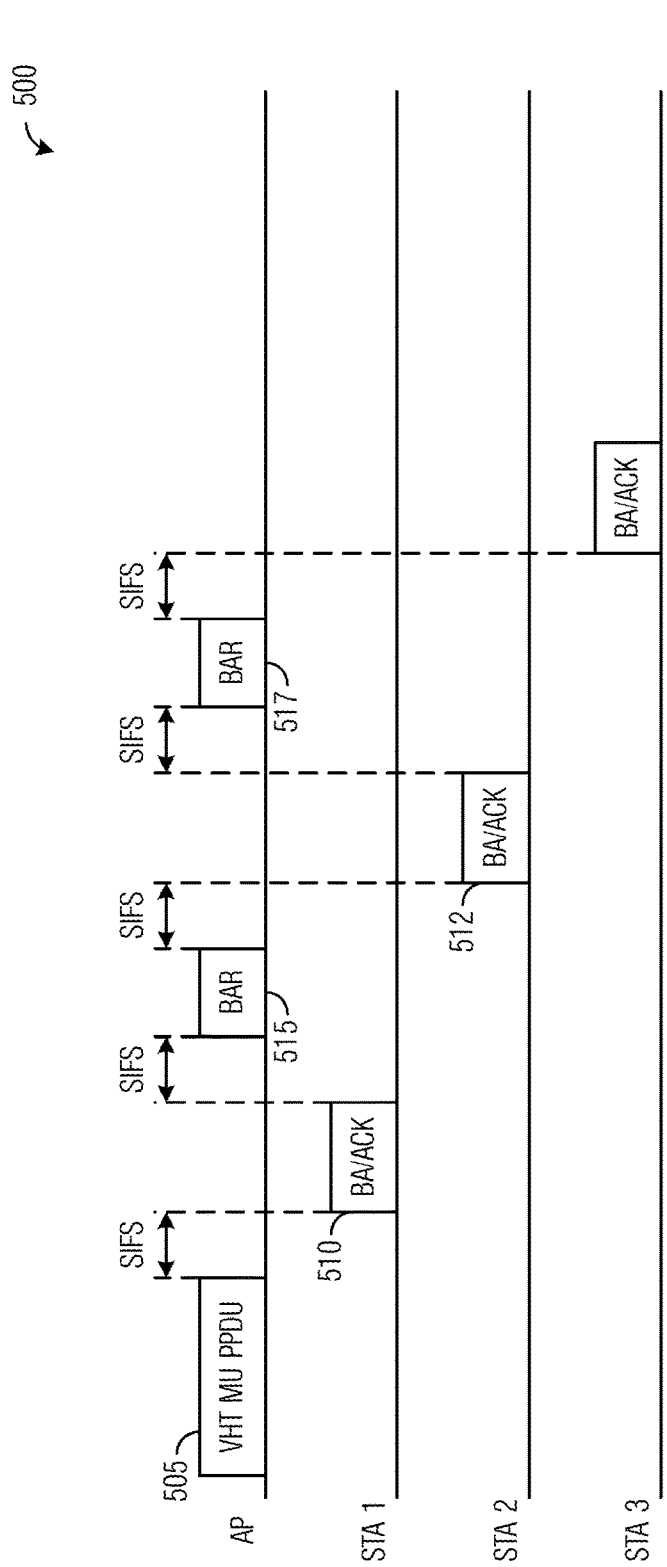
FIG. 5 illustrates an example embodiment of operations within a transmission opportunity (TXOP) for multicast data transmission in accordance with example embodiments disclosed herein.

A TXOP (such as TXOP1 432 in FIG. 4) is the time interval during which a STA (such as STA1 402) has the right to initiate frame exchanges onto the channel. FIG. 5 illustrates an example embodiment of operations within a TXOP 500 for multicast data transmission, using very high throughput (VHT) multi-user (MU) PHY protocol data unit (PPDU). As shown in FIG. 5, TXOP 500 includes not only the time required to transmit the data 505 by the data source STA or AP, but also the time required by one or more data sink STAs to each transmit an acknowledgement (ACK) or a block ACK (BA) frame such as BA/ACK 510 and BA/ACK 512, plus the time required by the data source STA or AP to transmit one or more block ACK request (BAR) frames, such as BAR 515 and BAR 517, to one or more data sink STAs, and plus all the short inter-frame spaces (SIFSs) in between. A TXOP can also be used to transmit a single user MAC protocol data unit (MPDU) or a multi-destination aggregated MPDU (A-MPDU).

Referring back to FIG. 4, STA1 402 may have estimated the duration of TXOP1 432 based on the amount of data to be transmitted, a modulation and coding scheme (MCS) to be used for transmitting the data, the time required for transmitting any ACK, BA, or BAR frame, and any SIFS required in between. STA1 402 may further include a Duration field in the MAC header of TIME 414. The Duration field in the MAC header of TIME 414 may be set to be equal to the duration from the end of TIME 414 to the end of TXOP1 432, i.e., the time T11 482 minus the time T4 468.

Basically, as soon as a data source STA wins the channel contention for transmitting its Paging frame, the data source STA knows that it is the next in line to transmit a data during the Data Transmission Window, unless the data source STA aborts the paging as described later. Therefore, it knows the starting time of the TXOP that it wants to subscribe, e.g., by deriving it from the ending time of the previous TXOP subscribed by another STA. Then, with the duration of its own TXOP that it has computed, the data source STA can determine the ending time of its TXOP, i.e., the ending time of its TXOP equals to the sum of the starting time and the duration of its TXOP. Also, as soon as the data source STA wins the channel contention for transmitting its Paging frame, the data source STA knows the ending time for transmitting its anticipated Timing frame. Therefore, the data source STA can compute the Duration value in the MAC header of its Timing frame to be equal to the ending time of its TXOP minus the ending time of its Timing frame.

Thus, by setting the Duration field in the MAC header of TIME 414 to be equal to the duration from the end of TIME 414 to the end of TXOP1, STA1 402 prevents any non-NAN2 802.11 STAs (i.e., 802.11 STAs that are not compliant with the Wi-Fi Alliance NAN2 standard) from transmitting during the time period from the end of TIME 414 to the end of TXOP1, thereby ensuring that STA1 402 can transmit DATA 430 at time T10 480 without the need for contending for the channel with a non-NAN2 802.11 STA. All other NAN2-compliant STAs (such as STA2 404, STA3 406, and STA4 408) don't set their respective NAV counters by the Duration value in a Timing frame (such as TIME 414), so that, during the rest of the Paging Window 411, once they determine the channel has been idle for more than a DIFS period, they may continue to contend the channel for transmitting their respective Paging frames, based on the operations described before. It is noted that STA1 402 also prevents other NAN2 data source STAs from using its subscribed TXOP (such as TXOP1 432) for transmitting data, not by the Duration field in the MAC header of its Timing frame (such as TIME 414), but by advertising the timing information of it subscribed TXOP (such as TXOP1 432), thus eliminating the need for STA1 402 to contend for the channel with a NAN2 STA when transmitting the data (such as DATA 430).

According to a first example embodiment, the timing information in a Page frame specifying a TXOP includes a starting time of the TXOP and the duration of the TXOP. As an example, the timing information in PAGE 410 specifying TXOP1 432 includes the starting time of TXOP1 432 (such as T10 480) and the duration of the TXOP1 432.

Alternatively, according to a second example embodiment, the timing information in a Page frame specifying a TXOP includes a starting time of the TXOP and an ending time of the TXOP. As an example, the timing information in PAGE 410 specifying TXOP1 432 includes the starting time of TXOP1 432 (such as T10 480) and the ending time of TXOP1 432 (such as T11 482), wherein the ending time of the TXOP1 432 is equal to the sum of the starting time and the duration of TXOP1 432.

Alternatively, according to a third example embodiment, the timing information in a Page frame specifying a TXOP includes the duration of the TXOP and a value contained in a Duration field in the MAC header of a Timing frame, wherein the Duration field is set to a value equal to the duration from the end of the Timing frame to the end of the TXOP. As an example, the timing information in PAGE 410 specifying TXOP1 432 includes the duration of TXOP1 432 and the value contained in the Duration field in the MAC header of TIME 414, wherein the Duration field in the MAC header of TIME 414 is set to a value equal to the duration from the end of TIME 414 to the end of TXOP1 432. Thus, any NAN2 STA (including the target data sink STA and a third-party NAN2 STA) receiving TIME 414 may derive the ending time of TXOP1 432 from the time when it receives the end of TIME 414 and the value in the Duration field in the MAC header of TIME 414, i.e., the ending time of TXOP1 432 equals to the sum of the time when the end of TIME 414 is received and the value in the Duration field in the MAC header of TIME 414. Then, the starting timing of TXOP1 432 may be derived as the value equal to the ending time of TXOP1 432 minus the duration of TXOP1 432.

Alternatively, according to a fourth example embodiment, the timing information in a Page frame specifying a TXOP includes a duration of the TXOP and a value contained in the Duration field field in the MAC header of a Timing frame, wherein the Duration field in the MAC header of the Timing frame is set to a value equal to a duration from the end of the Timing frame to the beginning of the TXOP. As an example, the timing information in PAGE 410 specifying TXOP1 432 may include the duration of TXOP1 432 and the value contained in the Duration field in the MAC header of TIME 414, wherein the Duration field in the MAC header of TIME 414 is set to a value equal to the duration from the end of TIME 414 to the beginning of TXOP1 432. Thus, any NAN2 STA receiving TIME 414 may derive the starting time of TXOP1 432 from the time when it receives the end of TIME 414 and the value in the Duration field in the MAC header of TIME 414, i.e., the starting time of TXOP1 432 equals to the sum of the time when the end of TIME 414 is received and the value in the Duration field in the MAC header of TIME 414. Then, the ending timing of TXOP1 432 may be derived as the value equal to the sum of the starting time of TXOP1 432 and the duration of TXOP1 432.

The starting time, the ending time, and the duration of a subscribed TXOP may be expressed in the unit of microsecond, millisecond, or any pre-specified time unit such as a time block. The starting time and the ending time of all subscribed TXOPs within the same NDL slot may be expressed as a time offset relative to a common timing reference, such as the beginning of the Paging Window of that NDL slot (such as T0 460 in FIG. 4, for example) or the beginning of the Data Transmission Window of that NDL slot (such as T10 480 in FIG. 4, for example). Alternatively, the starting time and the ending time of a TXOP may be expressed as a time offset relative to the end of the Timing frame that carries that the starting time and the ending time information.

A pre-specified short interval (such as a SIFS) after transmitting the PA frame (such as PA 412), if STA2 404 receives a Timing frame (such as TIME 414), STA2 404 stores the timing information of the subscribed TXOP (such as TXOP1 432), which is included in the received Timing frame (such as TIME 414). In the third and the fourth embodiments as described before, STA2 404 may further perform computations in order to derive the starting time of the subscribed TXOP (such as TXOP1 432) for receiving a data (such as DATA 430). STA2 404 may also perform computations in order to convert the explicitly expressed timing information, which may be expressed relative to a common timing reference (such as the beginning of the Paging Window), into timing information that are relative to a local clock in order to carry out operations such as transmitting a frame (e.g., the ACK frame) or receiving a frame (e.g., the data).

A pre-specified short interval (such as a SIFS) after receiving the Timing frame (such as TIME 414), STA2 404 may further transmit a Timing Acknowledgement (TA) frame (such as TA 416). TA 416 may also include the timing information of the subscribed TXOP (such as TXOP1 432). Some of the timing information in TA 416 may be directly copied from the same timing information in the received TIME 414. For example, in the first and the second embodiments as described before, if the starting time and ending time of the subscribed TXOP are expressed as a time offset relative to a common timing reference (such as the beginning of the Paging Window 411 or the beginning of the Data Transmission Window 431), the starting time and ending time of the subscribed TXOP in TA 416 may be directly copied from those in the received TIME 414. For another example, in the first, the third, and the fourth embodiments as described before, the duration of the subscribed TXOP in TA 416 may be directly copied from that in the received TIME 414. Some of the timing information in TA 416 may be derived from the same timing information in the received TIME 414. For example, in the first and the second embodiments as described before, if the starting time and ending time of the subscribed TXOP are expressed as a time offset relative to the end of the frame that carries them (such as TIME 414 and TA 416), the starting time and ending time of the subscribed TXOP in TA 416 may be computed as the respective values of the starting time and ending time of the subscribed TXOP in TIME 414 minus the sum of the durations of TA 416 and a SIFS. This adjustment, which is made by a responding data sink station, such as STA2 404, ensures that both TIME 414 and TA 416 subscribe the same time period in this example. It should be noted that when a data source STA pages multiple data sink STAs in a single Paging frame, not every data sink STA being paged has to send a TA frame back in response to receiving the Timing frame. The resolution is similar to the one with the PA frame as described before.

TA 416 may further include a Duration field in the MAC header. The Duration field in the MAC header in TA 416 may be computed as the value contained in the Duration field in the MAC header in the received TIME 414 minus the sum of the durations of TA 416 and a SIFS. This ensures that both TIME 414 and TA 416 protects the same time period from being used by non-NAN2 STAs. And again, all other NAN2 STAs (such as STA1 402, STA3 406, and STA4 408) don't set their respective NAV counters by the Duration value in a TA frame (such as TA 416), so that, during the rest of the Paging Window, once they determine the channel has been idle for more than a DIFS period, they may continue to contend for the channel for transmitting their respective Paging frames. Since transmitting PA 412 already serves as the acknowledgement to the Paging frame and as an indication that the data sink STA will be awake to receive the data, the main purpose of transmitting TA 416 is to propagate, in the proximity of the data sink STA, the timing information of the subscribed TXOP (so that more NAN2 STAs may learn the subscribed TXOP thus they may avoid subscribing the same time period), and to propagate the Duration value in the MAC header (so that more non-NAN2 STAs may set their respective NAV counters to the Duration value). This helps to counter the hidden node problem. STA1 402 may not be required to receive TA 416 correctly in order to transmit the data (such as DATA 430) at the subscribed time.

A pre-specified short interval (such as a SIFS) after transmitting the PA frame (such as PA 412), if STA2 404 doesn't receive a Timing frame (such as TIME 414), STA2 404 may still consider that its PA frame (such as PA 412) has been received by the data source STA, and a Timing frame has been transmitted by the data source STA but is lost in the transmission, rather than considering that the data source STA has aborted the paging, e.g., after failed to receive the PA frame due to a collision on the PA frame. As a result, STA2 404 may keep awake during the entire Data Transmission Window 431 to receive the data. This is to ensure that a failure in receiving the Timing frame doesn't stop the data sink STA from receiving the data (even without the timing information). In this way, the data sink STA may lose a little bit of power, if the data source STA has indeed aborted the paging, but not taking the risk of losing the data. However, in certain implementation, the data sink STA may determine if the data source STA has indeed aborted the paging, e.g., if the data sink STA hears all the timing information of the subscribed TXOPs by other STAs and determines that there is no time gap that it doesn't know of. In this case, the data sink STA may determine that the data source STA has aborted the paging and then the data sink STA may go to a power saving mode during the Data Transmission Window 431.

While waiting for the channel to become idle again, STA3 406 may keep monitoring the Timing frames and TA frames sent by other NAN2 STAs in order to keep track of the ending time of the last TXOP subscribed by another STA. At time T5 470, the NAV counter of STA3 406 becomes zero, indicating that the channel is idle. STA3 406 may also physically detect that the channel becomes idle. At time T6 472, STA3 406 resumes counting down its backoff timer as the channel has been idle for a DIFS period. At time T7 474, STA3 306 counts down its backoff timer to zero and transmits PAGE 420 (which is acknowledged by PA 422). Once STA3 406 wins the channel contention and transmits its Paging frame (such as PAGE 420), STA3 406 knows that it will be the next STA in line to transmit a data during the Data Transmission Window. Therefore, STA3 406 knows that the TXOP (such as TXOP2 442 in FIG. 4) that it wishes to subscribe in order to transmit DATA 440 to STA4 408 should start at one pre-specified short interval (such as a SIFS or a PIFS) after the ending time of the previous TXOP, which is TXOP1 432 in the example illustrated in FIG. 4. STA3 406 may also compute the duration of TXOP2 442 based on the same method that STA1 402 used for TXOP1 432, as described before. Then, from the starting time and the duration of TXOP2 442, STA3 406 may compute the ending time of TXOP2 442 and the value to be set to a Duration field in the MAC header of an anticipated Timing frame (TIME 424), in the same way as in TIME 414, as described before. Then, STA3 406 may generate TIME 424, including the Duration field in the MAC header containing the computed Duration value and including the timing information of TXOP2 442 in a frame body of TIME 424.

At one pre-specified short interval (such as a SIFS) after receiving PAGE 420, STA4 408 may transmit PA 422 to STA3 406 to acknowledge the reception of PAGE 420 and to indicate that STA4 408 will be ready to receive the data. At one pre-specified short interval (such as a SIFS) after receiving PA 422, STA3 406 may transmit TIME 424. At one pre-specified short interval (such as a SIFS) after receiving TIME 424, STA4 408 may transmit TA 426, including the timing information of the subscribed TXOP2 442, in the same way as in TA 416, as described before.

Then, at the beginning of TXOP1 432 (T10 480), STA1 402 starts to transmit DATA 430 to STA2 404 without having to contend for the channel again, because there are no other Wi-Fi STAs (NAN2 or non-NAN2) that are able to gain the access to the channel at the moment. A SIFS period after receiving DATA 430, STA2 404 transmits an acknowledgement (ACK) frame (ACK 435) to STA1 402 to acknowledge the reception of DATA 430. At the beginning of TXOP2 442 (T12 484), STA3 406 starts to transmit DATA 440 to STA4 408 without having to contend for the channel again. At one SIFS after receiving DATA 440, STA4 408 transmits an ACK frame (ACK 445) to STA3 406 to acknowledge the reception of DATA 440.

There may be other IEEE 802.11-compliant Wi-Fi STAs or APs in the proximity that may not be complaint with the Wi-Fi Alliance defined NAN2 specification. These Wi-Fi STAs or APs may also wish to access the same channel during the Paging Window 411 or the Data Transmission Window 431 in order to transmit their data. However, due to the Duration fields in the Timing frames (such as TIME 414 and TIME 424) and the TA frames (such as TA 416 and TA 426), the NAV counters of these non-NAN2 STAs have a non-zero value (indicating the channel is busy) until all subscribed TXOPs during the Data Transmission Window are over. Therefore, these non-NAN2 STAs will not be able to initiate any attempts to transmit onto the channel until all subscribed TXOPs are over. In FIG. 4, blocks 454, 456, and 458 illustrate the time period during which the NAV counter of a non-NAN2 STA (STA5 409) has a non-zero value. The NAV counter of STA5 409 is initially set to a non-zero value after receiving PAGE 410 (block 454). It is extended after receiving TIME 414 (block 456) and is further extended after receiving TIME 424 (block 458).

By avoiding the second channel contention for each data source STA, the channel during the Data Transmission Window in FIG. 4 is utilized more efficiently than that in FIG. 3. By preventing a non-NAN2 STA from using the Data Transmission Window until all NAN2 data are transmitted, an NDL slot may be used almost exclusively by NAN2 STAs unless there is not enough NAN2 data to fill in the NDL slot. The more exclusively that an NDL slot can be used for NAN2 data, the less number of NDL slots need to be allocated to satisfy the same amount of NAN2 data traffics, thereby more time (outside the NDL slots) for the NAN2 STAs to enter a power saving mode. As the NAN2 STAs eventually enter a power saving mode outside the NDL slots and the DWs, non-NAN2 Wi-Fi STAs or APs will sooner or later be able to contend for the channel in order to transmit their respective data. Therefore, the overall fairness among the NAN2 STAs and non-NAN2 STAs can be maintained by carefully configuring the number and duration of NDL slots.

Figure 6:
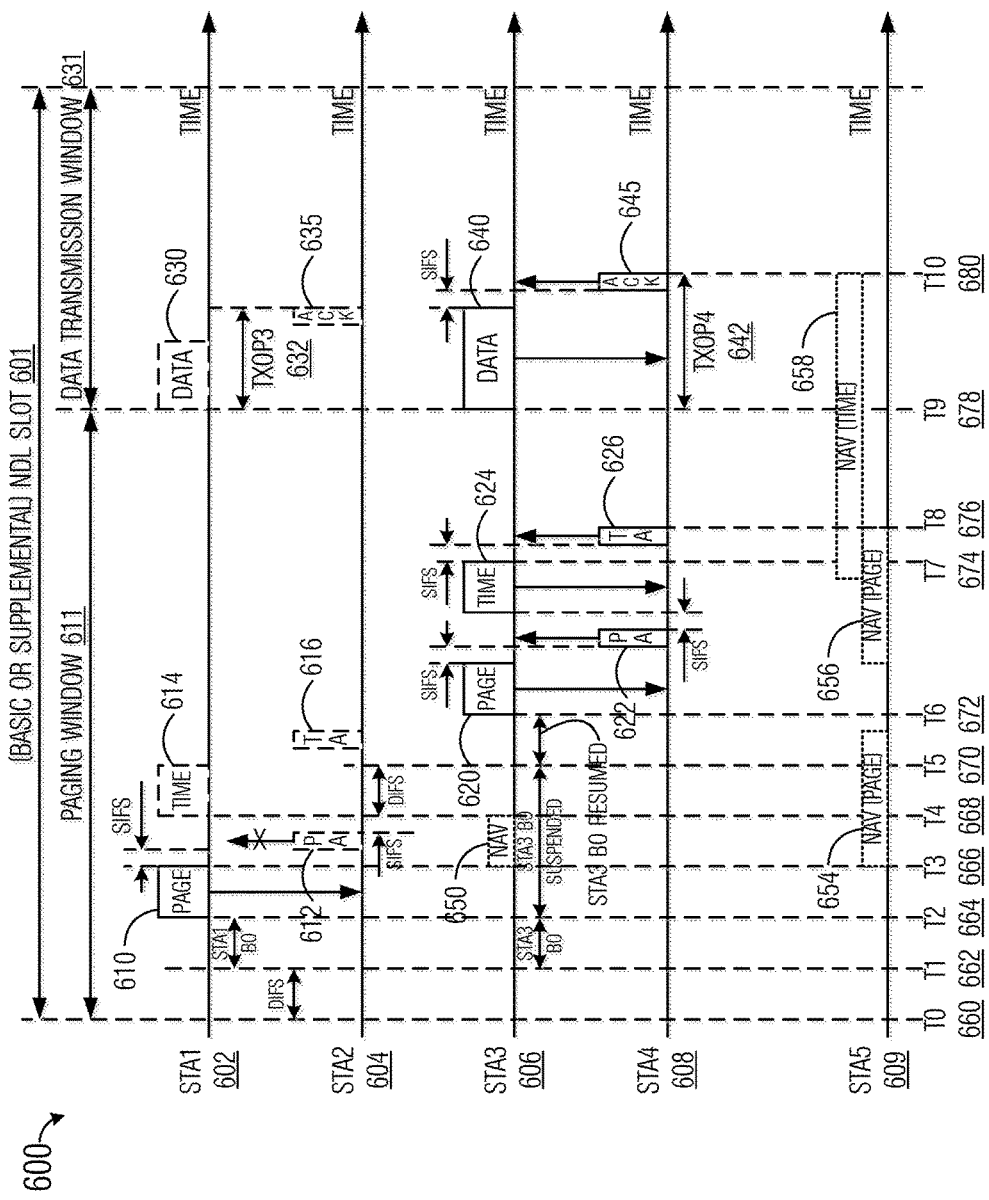
FIG. 6 illustrates another example embodiment of enhanced operations within a NDL slot in accordance with example embodiments disclosed herein.

FIG. 6 illustrates an example embodiment of enhanced operation 600, which is similar to operation 400 as illustrated in FIG. 4, except that STA1 602 doesn't receive the PA frame (PA 612) at the pre-specified short interval (such as a SIFS) after transmitting the Paging frame (PAGE 610). As a result, STA1 602 may consider that the Paging frame (PAGE 610) has failed or there is no target data sink STA in the proximity. Therefore, STA1 402 may abort the remaining steps of the paging exchanges that it has initiated, such as transmitting the Timing frame (TIME 614) and receiving the TA frame (TA 616), as well as the pending transmission of DATA 630. Since STA1 602 never transmits TIME 614 (which was intended to announce the timing information of TXOP3 632, which STA1 602 originally wished to subscribe in order to transmit Data 630), the subscription of TXOP3 632 never materialized and TXOP3 632 is not known to other NAN2 STAs. Therefore, the time periods that other NAN2 STAs may wish to subscribe (such as TXOP4 642 to be subscribed by STA3 606) are not affected by STA1 602's wining the channel contention. So, a time period of a TXOP is not subscribed until the acknowledgement to the associated Paging frame is successfully received. This helps to make the mechanism, by which multiple peer communications stations may subscribe a shared wireless channel for data transmissions without a centralized control entity, more robust so that conflicting (i.e., overlapping) subscriptions or unused (therefore wasted) subscriptions may be avoided. In FIG. 6, STA3 606 resets its NAV counter (shown as NAV 650) when it detects that the channel remains idle, after receiving the end of PAGE 610, for a duration that equals to the sum of durations of a PA frame and two SIFSs. This special behavior may only apply to NAN2 STAs. A non-NAN2 STA (such as STA5 609), being non-compliant with the Wi-Fi Alliance defined NAN2 standard, can't reset its NAV counter (shown as NAV 654) earlier. Therefore, STA3 606 may be able to resume counting down of its backoff timer earlier than non-NAN2 STAs, giving it an advantage for winning the channel contention.

The Duration field in the MAC header in the Timing frames (such as TIME 414, TIME 424, and TIME 624) and in the TA frames (such as TA 416, TA 426, and TA 626) need to be backward compatible with the Duration field in the MAC header of the existing frames as defined in IEEE 802.11 Standards, in order to ensure that legacy STAs can process the Duration field properly. The Duration field in the MAC header of the exiting 802.11 frames can only cover a time period of up to 32767 microseconds after the end of the frame that carries the Duration field. However, a Data Transmission Window in an NDL slot may be longer than 32767 microseconds. In that case, the Duration field in the MAC header of a Timing frame or TA frame may not be able to cover to the end (or even the beginning) of a subscribed TXOP if that subscribed TXOP is far away from the Paging Window (e.g., more than 32767 microseconds away from the end of the Paging Window).

Figure 7:
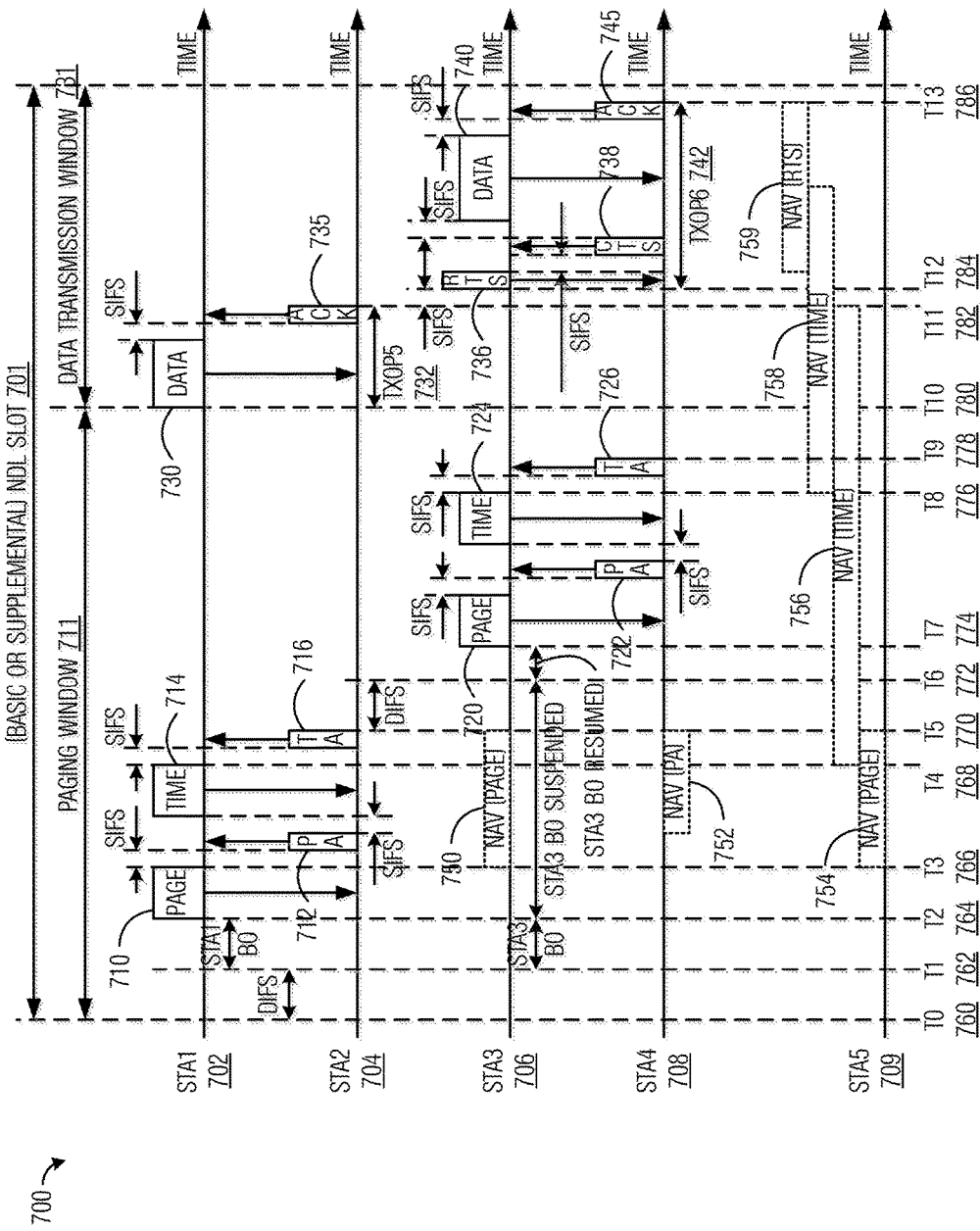
FIG. 7 illustrates yet another example embodiment of enhanced operations within a NDL slot in accordance with example embodiments disclosed herein.

FIG. 7 illustrates an example embodiment of enhanced operation 700, which is similar to operation 400 as illustrated in FIG. 4, except a request to send (RTS) frame and a clear to send (CTS) frame may be also used to protect a subscribed TXOP. For example, STA3 706 may determine that, after STA1 702 has subscribed TXOP5 732, the time period that STA3 706 wishes to subscribed (such as TXOP6 742) is too far away from the end of TIME 724 for the Duration field in the MAC header of TIME 724 to cover. In other words, the TXOP6 742 is more than 32767 microseconds away from TXOP5 732. Therefore, STA3 706 sets the Duration field in the MAC header of TIME 724 to the maximal allowed value, which is 32767, and modifies the timing information of TXOP6 742 to further include the exchange of an RTS frame (e.g., RTS 736) and a CTS frame (e.g., CTS 738) plus two SIFSs into TXOP6 742. The exchange of RTS 736 and CTS 738 occurs before the transmission of DATA 740. The Duration field in the MAC header of RTS 736 is set to a value that covers to the end of TXOP6. Since the largest amount of data a MDPU can carry in Wi-Fi usually takes far less than 32767 microseconds to transmit and since RTS 736 is very close to Data 740, the Duration field in the MAC header of RTS 736 should be able to cover to the end of TXOP6 742 while still being able to compliant with the legacy design limit. IEEE 802.11 Standards specify a way to disassemble a really large data packet into multiple data MPDUs and transmit them using multiple cascaded data frames, wherein a Duration field in the first data frame provides protection to the end of the second data frame, and a Duration field in the second data frame provides protection to the end of the third data frame, and so on. Such a technique can be used in the TXOPs described in this disclosure for an extended (longer than 32767 microseconds) data transmission. In such a situation, a Duration field in an RST frame and a CTS frame before the first data frame can provide protection to the first data frame, which will include a Duration field to provide protection to the second data frame, and so on.

As illustrated in FIG. 7, STA3 706 doesn't need to perform channel contention for transmitting RTS 736 as it has subscribed TXOP6 742 for transmitting RTS 736, receiving CTS 738, transmitting DATA 740, and receiving ACK 745, as well as a corresponding number of SIFSs. In FIG. 7, blocks 754, 756, 758, and 759 illustrate the time period during which the NAV counter of a non-NAN2 STA (STA5 709) has a non-zero value. The NAV counter of STA5 709 is initially set to a non-zero value after receiving PAGE 710 (shown as NAV block 754). It is extended after receiving TIME 714 (shown as NAV block 756) and is further extended after receiving TIME 724 (shown as NAV block 758), at which point, however, it is still short of covering to the end of TXOP6. But after receiving RTS 736, it is further extended to fully cover TXOP6 742 (shown as NAV block 759).

Alternatively, an exchange of a Quality of Service (QoS) Null data frame and an ACK control frame (both are defined in IEEE 802.11 Standards) may be used to replace the exchange of the RTS frame and the CTS frame as shown in FIG. 7.

Alternatively, an exchange of an RTS frame and a CTS frame (or an exchange of a QoS Null data frame and an ACK control frame) may be always required before the transmission of the data during the Data Transmission Window, no matter how far the subscribed TXOP is away from the end of the Timing frame that subscribes the TXOP. The RTS and CTS frames (or the QoS Null data frame and the ACK control frame), as well as the required SIFS gaps, need to be budgeted into the computation of the duration of the subscribed TXOP. In this way, even if a non-NAN2 STA wakes up during the gap between the Timing frame and the TXOP (thus missing the chance to set its NAV counter by the Duration field in the Timing frame), the non-NAN2 STA will still set its NAV counter by the Duration field in the RTS frame or the CTS frame (or the QoS Null data frame or the ACK control frame), thus making it unable to access the channel during the TXOP. In this alternative embodiment, the data source STA still doesn't need to perform a channel contention for transmitting the RTS frame (or the QoS Null data frame) since transmitting the RTS frame and receiving the CTS frame (or transmitting the QoS Null data frame and receiving the ACK control frame) is a part of the subscribed TXOP.

Figure 8:
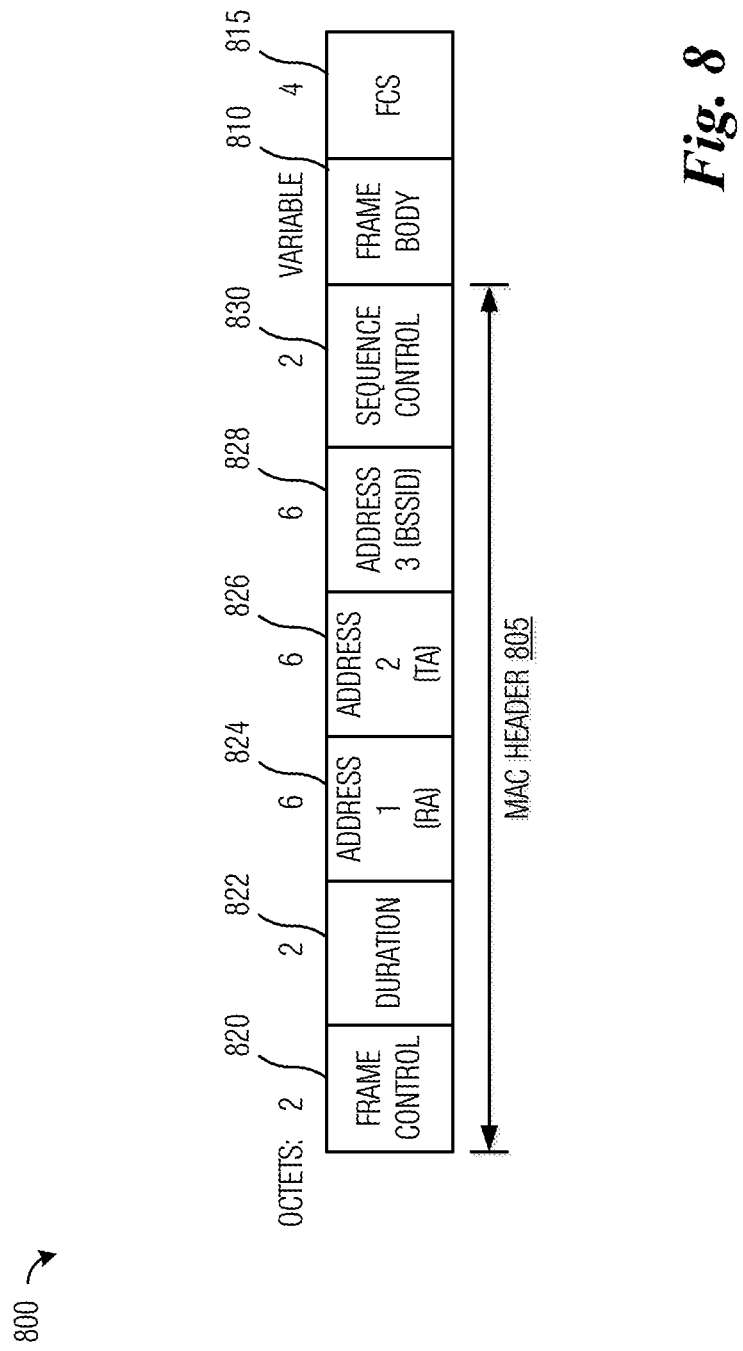
FIG. 8 illustrates an example embodiment of a Paging frame in accordance with example embodiments disclosed herein.

According to an example embodiment, the Paging frame (such as PAGE 410, PAGE 420, PAGE 610, PAGE 620, PAGE 710, and PAGE 720) may be an announcement traffic indication message (ATIM) frame as defined in the IEEE 802.11 Standards if there is only one data sink STA to be paged. According to another example embodiment, the Paging frame (such as PAGE 410, PAGE 420, PAGE 610, PAGE 620, PAGE 710, and PAGE 720) may be a new Paging frame that is based on a Vendor Specific Public Action frame as defined in the IEEE 802.11 Standards. FIG. 8 illustrates an example Paging frame 800. As shown in FIG. 8, Paging frame 800, which is based on a Vendor Specific Public Action frame, includes a MAC header 805, a frame body 810, and a frame check sum (FCS) 815. The MAC header 805 includes a Frame Control field 820, a Duration field 822 (as described previously), an Address 1 field 824 (which is also referred to as the receiver address (RA) field), an Address 2 field 826 (which is also referred to as the transmitter address (TA) field), an Address 3 field 828, and a Sequence Control field 830. The frame body of Paging frame 800 may include a Paging Attribute field, which may contain one or a list of identifiers of the STAs being paged, as illustrated in Table 1 shown below.

TABLE 1

The Format and Contents of the Frame Body field of Paging frame 800.

| Field Name: | Size (Octets) | Value (Hex) | Description: |
| --- | --- | --- | --- |
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | 0x14 | Identifying that the type of the Vendor-Specific Public Action frame is Paging frame |
| Paging Attribute | Variable | Variable | Containing one or more identifiers of the STAs being paged. |

According to an example embodiment, the PA frame (such as PA 412, PA 422, PA 622, PA 712, and PA 722) may be an ACK control frame as defined in the IEEE 802.11 Standards.

According to an example embodiment, the Timing frame (such as TIME 414, TIME 424, TIME 624, TIME 714, and TIME 724) may be a new Timing frame that is based on a Vendor Specific Public Action frame as defined in the IEEE 802.11 Standards. The Timing frame may have a similar frame format as in Paging frame 800, as illustrated in FIG. 8. The frame body of the Timing frame is shown in Table 2 below.

TABLE 2

The Format and Contents of the Frame Body field of Timing frame.

| Field Name: | Size (Octets) | Value (Hex) | Description: |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | 0x15 | Identifying that the type of the Vendor-Specific Public Action frame is Timing frame. |
| Timing Attribute | Variable | Variable | Containing the timing information of the subscribed TXOP. |

According to an example embodiment, the TA frame (such as TA 416, TA 426, TA 626, TA 716, and TA 726) may be a new TA frame that is based on a Vendor Specific Public Action frame as defined in the IEEE 802.11 Standards. The TA frame may have a similar frame format as in Paging frame 800, as illustrated in FIG. 8. The frame body of the TA frame is shown in Table 3 below.

TABLE 3

The Format and Contents of the Frame Body field of TA frame.

| Field Name: | Size (Octets) | Value (Hex) | Description: |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | 0x16 | Identifying that the type of the Vendor-Specific Public Action frame is TA frame. |
| Timing ACK Attribute | Variable | Variable | Containing the timing information of the subscribed TXOP. |

In an alternative example embodiment, the Timing frame and the TA frame share the same Vendor Specific Public Action frame and the same OUI Type value. The Attribute IDs of the Time Attribute and the Timing ACK Attribute can be used to differentiate which frame is transmitted.

According to another example embodiment, the Paging frame, the Timing frame, and the TA frame is an IEEE 802.11 defined Extension frame, which includes a Type field in a Frame Control field in the MAC header, the Type field set to a value of "11".

Figure 9:
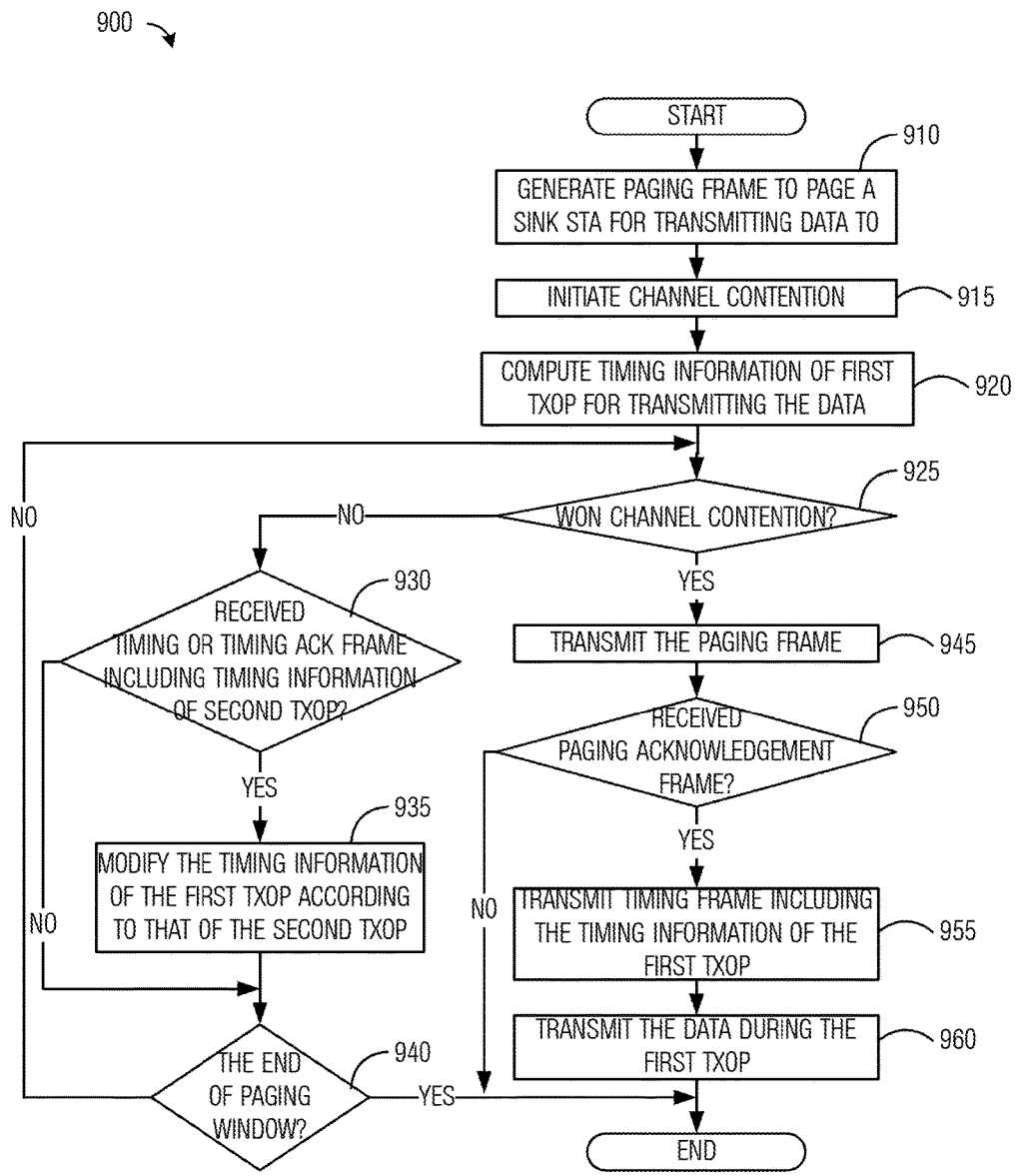
FIG. 9 illustrates a flow diagram of example operations occurring in a data source station in accordance with example embodiments disclosed herein.

FIG. 9 illustrates a flow diagram of example operations 900 occurring in a data source station (i.e. a communications station having a data to transmit). Operations 900 may be indicative of operations occurring in communications station such as a NAN2 STA, as the communications station transmits a data.

Operations 900 begin with the data source station generating a Paging frame to page a data sink station (i.e., a communications station receiving a data), to which the data is to be transmitted, the Paging frame including an identifier of the data sink station (block 910). The data source station initiates a channel contention for transmitting the Paging frame during a paging window (block 915). The data source station computes the timing information of a first TXOP for transmitting the data to the data sink station (block 920). The data source station determines if it has won the channel contention (block 925). If not, the data source station further determines if it has received a Timing frame or a Timing ACK frame carrying the timing information of a second TXOP, during which a third station wishes to transmit (block 930).

If the data source station determines that it hasn't received the Timing frame or the Timing ACK frame in block 930, the data source station may further determine if the paging window has ended (block 940). If the data source station determines that it has received the Timing frame or the Timing ACK frame in block 930, the data source station modifies the timing information of the first TXOP such that the first TXOP, as modified, follows the second TXOP in time with a pre-specified short interval (such as a SIFS) in between (block 935), and then the data source station determines if the paging window has ended (block 940). If the source station determines that the paging window has ended in block 940 and it has not won the channel contention for transmitting the Paging frame, it determines that it has lost the chance for transmitting the data in the current cycle and exits from operations 900.

If the data source station determines that the paging window hasn't ended in block 940, it goes back to determine if it has won the channel contention (block 925). If the data source station determines that it has won the channel contention in block 925, the data source station transmits the Paging frame (block 945). Then, the data source station determines if it has received a Paging Acknowledgement (ACK) frame acknowledging the reception of the Paging frame within a pre-specified short interval (such as a SIFS) after transmitting the Paging frame (block 950). If not, the data source station determines that the Paging frame has failed or there is no data sink station in its proximity. Thus, the data source station aborts the attempts of both paging the data sink station and transmitting the data to the data sink station. Then, the data source station exits operations 900.

If the data source station determines that it has received the Paging ACK frame within the pre-specified time in block 950, the data source station transmits a Timing frame including the timing information of the first TXOP (block 955). Then, the data source station transmits the data to the sink station during the first TXOP (block 960). Then, the data source station exits operations 900.

Figure 10:
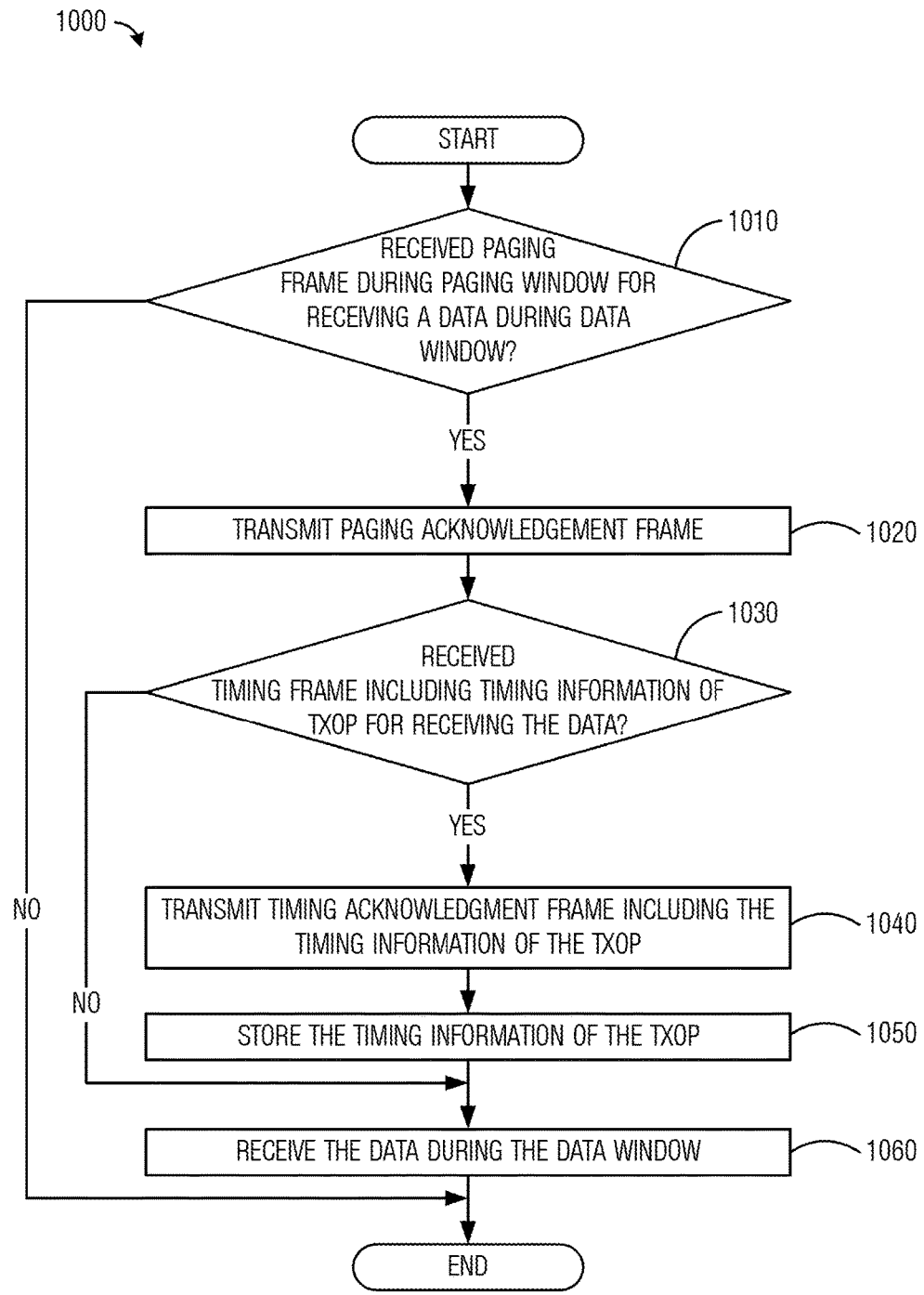
FIG. 10 illustrates a flow diagram of example operations occurring in a data sink station in accordance with example embodiments disclosed herein.

FIG. 10 illustrates a flow diagram of example operations 1000 occurring in a data sink station (i.e. a communications station receiving a data). Operations 1000 may be indicative of operations occurring in a communications station such as a NAN2 STA, as the communications station receives a data.

Operations 1000 begin with the data sink station determining if it has received a Paging frame target for it or its group during a Paging Window for receiving a data during a Data Window (block 1010). If not, the sink station exits operation 1000. If the data sink station determines that it has received the Paging frame target for it or its group during the Paging window in block 1010 (and in the situation where a group of stations have been paged, if the data sink station is also responsible for sending acknowledgement), the data sink station transmits a Paging ACK frame back a pre-specified short interval (such as a S IFS) after receiving the Paging frame (block 1020). Then, the sink station determines if it has received a Timing frame within a pre-specified short interval (such as a SIFS) after transmitting the Paging ACK frame, the Timing frame including the timing information of a time period, known as a transmission opportunity (TXOP), for receiving the data (block 1030). If not, the data sink station stays awake during the entire Data Window in order to receive the data (block 1060). If the data sink station determines that it has received the Timing frame within the pre-specified time in block 1030 (and in the situation wherein a group of stations have been paged, if the data sink station is also responsible for sending acknowledgement), it transmits a Timing ACK frame including the timing information of the TXOP (block 1040). The sink station stores the timing information of the TXOP for receiving the data (block 1050). Then, the data sink station receives its data during the Data Window (block 1060).

By knowing the timing information of the subscribed TXOP for transmitting or receiving its data, a NAN2 STA may further enter a power saving mode within the Data Transmission Window as long as outside the subscribed TXOP. The NAN2 STA may exit the power saving mode during the subscribed TXOP in order to transmit or receive the data.

The example embodiments described herein use the Wi-Fi Alliance Neighboring Awareness Network (NAN) stations merely as example communications stations. The same embodiments can be applied to any peer-to-peer wireless communications, such as the ones based on Bluetooth (BT), Bluetooth Low Energy (BLE), ZigBee, IEEE 802.15.4, IEEE 802.15.8 (Peer Aware Communications or PAC), the next generation evolution of 802.11/Wi-Fi technologies, the evolution of IEEE 802.11s mesh network, Long Term Evolution (LTE) Device-to-Device (D2D), etc.

Figure 11:
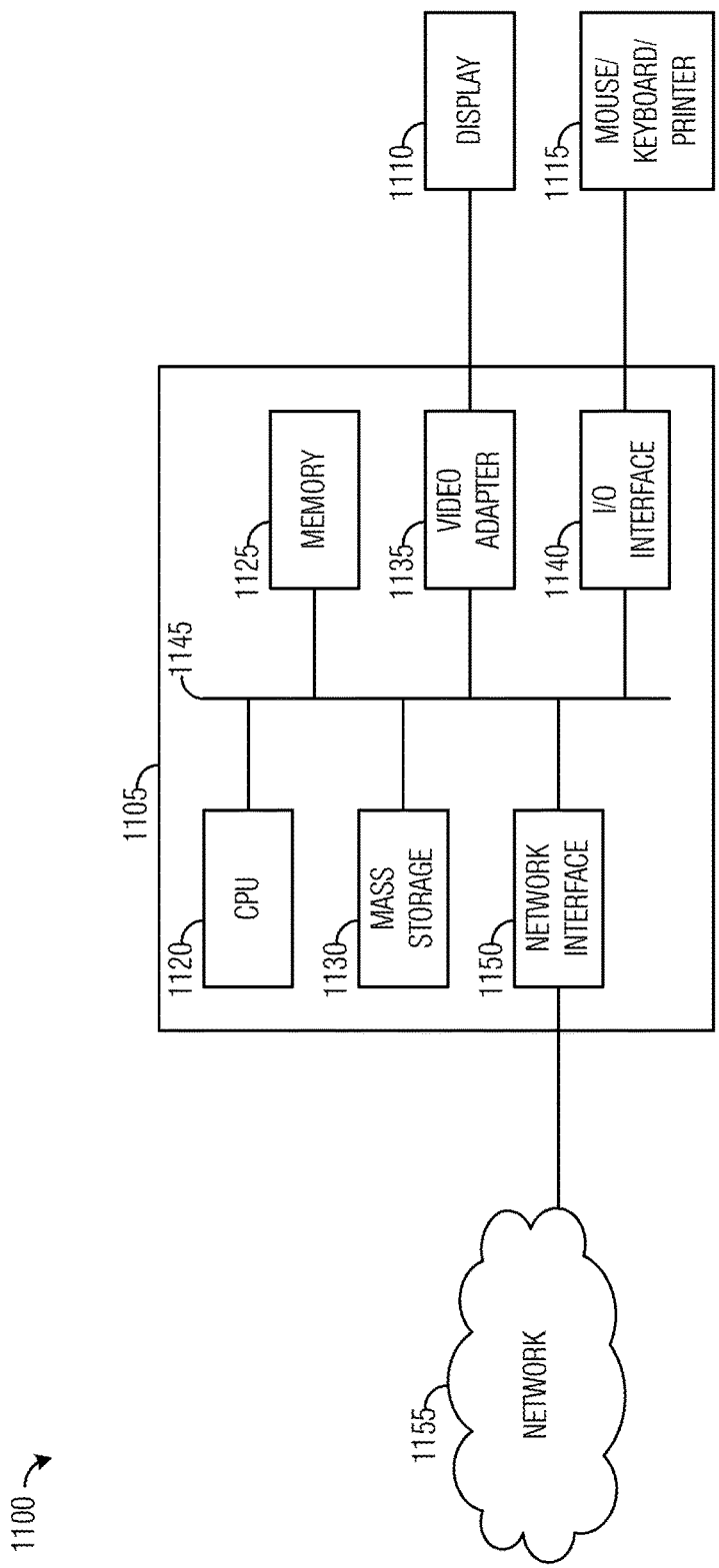
FIG. 11 is a block diagram of a processing system that may be used for implementing the devices and methods disclosed herein.

FIG. 11 is a block diagram of a processing system 1100 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 1105 equipped with one or more input/output devices, such as a human interface 1115 (including speaker, microphone, mouse, touchscreen, keypad, keyboard, printer, and the like), display 1110, and so on. The processing unit may include a central processing unit (CPU) 1120, memory 1125, a mass storage device 1130, a video adapter 1135, and an I/O interface 1140 connected to a bus 1145.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces 1150, which may comprise wired links, such as an Ethernet cable or the like, and/or wireless links to access nodes or different networks 1155, such as neighbor awareness networks (NAN). The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 12:
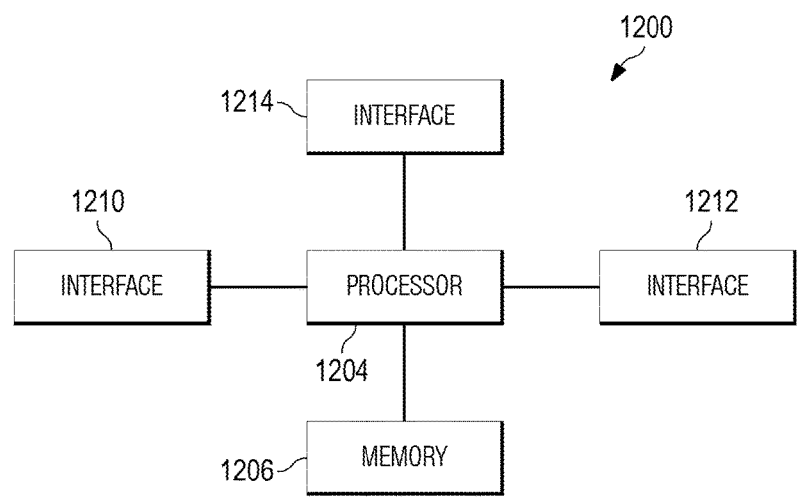
FIG. 12 illustrates a block diagram of an embodiment processing system for performing methods described herein.

FIG. 12 illustrates a block diagram of an embodiment processing system 1200 for performing methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 13:
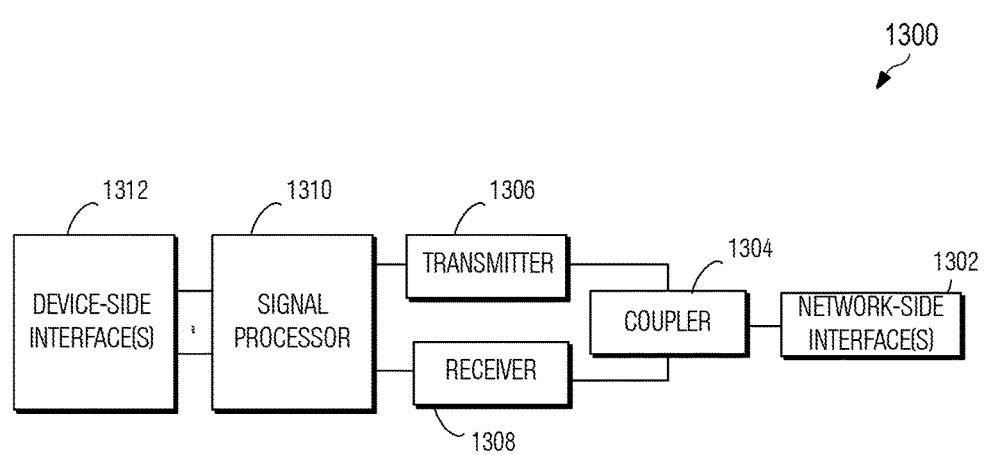
FIG. 13 illustrates a block diagram of a transceiver adapted to transmit and receive signaling over a wireless telecommunications network in accordance with example embodiments disclosed herein.

In some embodiments, one or more of the interfaces 1210, 1212, 1214 connects the processing system 1200 to a transceiver adapted to transmit and receive signaling over a wireless telecommunications network. FIG. 13 illustrates a block diagram of a transceiver 1300 adapted to transmit and receive signaling over a wireless telecommunications network, such as a neighbor awareness network (NAN). The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, a channel access unit/module, a modifying unit/module, an adjusting unit/module, a storing unit/module, and a power saving unit/module. The respective units/modules may be hardware, software, or a combination thereof. For instance, one or more of the units/modules may be an integrated circuit, such as field programmable gate arrays (FPGAs) or application-specific integrated circuits (ASICs).

Advantageous features of embodiments of the invention may include: a method for operating a first station configured to protect a shared communications channel from a second station, the method includes transmitting, by the first station during a paging window, a Paging frame including a first Duration field set to a first value equal to a sum of durations of a Paging Acknowledgement (PA) frame, a Timing frame, a Timing Acknowledgement (TA) frame, and three short inter-frame intervals (SIFSs), wherein the first value indicates that the shared communications channel is inaccessible to the second station for a duration spanning an end of the Paging frame to an end of the TA frame; receiving, by the first station, the PA frame including a second Duration field containing a second value indicating that the shared communications channel is inaccessible to the second station for a duration spanning an end of the PA frame to the end of the TA frame; and transmitting, by the first station, the Timing frame including a third Duration field set to a third value equal to a lesser of a maximum allowed duration and a duration spanning an end of the Timing frame to an end of a time period to be subscribed by the first station for transmitting data to a third station, wherein the third value indicates that the shared communications channel is inaccessible to the second station for the duration of the third value after the end of the Timing frame, and wherein the time period occurs after the paging window.

The method could further include, further comprising receiving, by the first station, the TA frame including a fourth Duration field containing a fourth value indicating that the shared communications channel is inaccessible to the second station for the duration of the fourth value after the end of the TA frame. The method could further include, further comprising, prior to transmitting the data, transmitting, by the first station, a request to send (RTS) frame including a fifth Duration field set to a fifth value equal to a lesser of the maximum allowed duration and a duration spanning an end of the RTS frame to the end of the time period, wherein the fifth value indicates that the shared communications channel is inaccessible to the second station for the duration of the fifth value after the end of the RTS frame, and receiving, by the first station, a clear to send (CTS) frame including a sixth Duration field containing a sixth value indicating that the shared communications channel is inaccessible to the second station for the duration of the sixth value after an end of the CTS frame. The method could further include, wherein the first and third stations are compliant with the Institute of Electrical and Electronic Engineers (IEEE) Standard 802.11 and a neighbor awareness networking (NAN) protocol, and wherein the second station is compliant with the IEEE Standard 802.11 but not the NAN protocol.

Although the present disclosure and its advantages have been described in detail, it should be understood that various changes, substitutions and alterations can be made herein without departing from the spirit and scope of the disclosure as defined by the appended claims.

What is claimed is:

1. A method for operating a first station configured to transmit data, the method comprising:
    transmitting, by the first station during a paging window, a first frame to page a second station, the first frame including an identifier associated with the second station;
    computing, by the first station, a first timing information for a first time period to be used by the first station for transmitting data to the second station, the first time period occurring after the paging window;
    in response to receiving a fourth frame including second timing information for a second time period to be used by a third station, the second time period occurring after the paging window:
        modifying, by the first station, the first timing information for the first time period in accordance with the second timing information such that the first time period, as modified, follows the second time period by a pre-specified short interval; and in response to receiving, after the pre-specified short interval after transmitting the first frame, a third frame acknowledging the first frame:
   transmitting, by the first station, a second frame including the first timing information after the pre-specified short interval after receiving the third frame, and
   transmitting, by the first station, the data during the first time period.

2. The method of claim 1, wherein the first timing information includes one of a starting time and an ending time of the first time period, or the starting time and a duration of the first time period.

3. The method of claim 1, wherein the first timing information includes a duration of the first time period and a value in a Duration field of the second frame, wherein the value in the Duration field is equal to a duration spanning an end of the second frame and an end of the first time period.

4. The method of claim 1, wherein the first timing information includes a duration of the first time period and a value in a Duration field of the second frame, wherein the value in the Duration field is equal to a duration spanning an end of the second frame and a beginning of the first time period.

5. A first station adapted for transmitting data comprising:
a non-transitory computer readable memory storage comprising instructions; and
one or more processors in communication with the memory storage, wherein the one or more processors execute the instructions to:
   transmit during a paging window, a first frame to page a second station, the first frame including an identifier associated with the second station,
   compute a first timing information for a first time period to be used by the first station for transmitting data to the second station, the first time period occurring after the paging window,
   in response to receiving a fourth frame including second timing information for a second time period to be used by a third station, the second time period occurring after the paging window:
      modifying, by the first station, the first timing information for the first time period in accordance with the second timing information such that the first time period, as modified, follows the second time period by a pre-specified short interval, and
   in response to receiving, after a pre-specified short interval after the first frame is transmitted, a third frame acknowledging the first frame:
      transmit a second frame including the first timing information after the pre-specified short interval after receiving the third frame, and
      transmit the data during the first time period.

6. The method of claim 1, further comprising performing, by the first station, a first channel contention before transmitting the first frame, wherein transmitting the first frame occurs in response to the first station winning the first channel contention, and wherein transmitting the data begins at a starting time of the first time period without the first station performing a second channel contention.

7. The first station of claim 5, wherein the one or more processors execute the instructions to perform a first channel contention before transmitting the first frame, wherein transmitting the first frame occurs in response to the first station winning the first channel contention, and wherein transmitting the data begins at a starting time of the first time period without performing a second channel contention.

8. The first station of claim 5, wherein the first timing information includes one of a starting time and an ending time of the first time period, or the starting time and a duration of the first time period.

9. The first station of claim 5, wherein the first timing information includes a duration of the first time period and a value in a Duration field of the second frame, wherein the value in the Duration field is equal to a duration spanning an end of the second frame and an end of the first time period.

10. The first station of claim 5, wherein the first timing information includes a duration of the first time period and a value in a Duration field of the second frame, wherein the value in the Duration field is equal to a duration spanning an end of the second frame and a beginning of the first time period.

* * * * *